United States Patent
Yoshikawa et al.

(10) Patent No.: US 10,300,435 B2
(45) Date of Patent: May 28, 2019

(54) AMMONIA GENERATION APPARATUS AND AMMONIA GENERATION CONTROL APPARATUS

(71) Applicant: NGK Spark Plug Co., LTD., Nagoya (JP)

(72) Inventors: Takaya Yoshikawa, Kasugai (JP); Kentaro Mori, Nagoya (JP); Hiroyuki Suzuki, Kasugai (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 15/041,826

(22) Filed: Feb. 11, 2016

(65) Prior Publication Data

US 2016/0250592 A1   Sep. 1, 2016

(30) Foreign Application Priority Data

Feb. 26, 2015  (JP) .................................. 2015-036509
May 25, 2015  (JP) .................................. 2015-105069

(51) Int. Cl.
*F01N 3/00* (2006.01)
*B01D 53/94* (2006.01)
(Continued)

(52) U.S. Cl.
CPC ..... *B01D 53/9431* (2013.01); *B01D 53/9495* (2013.01); *C01C 1/086* (2013.01);
(Continued)

(58) Field of Classification Search
CPC ............. F01N 2610/146; F01N 13/011; F01N 3/0293; F01N 2410/00; F01N 13/009; F01N 2610/02; B01D 2251/2067
(Continued)

(56) References Cited

U.S. PATENT DOCUMENTS 5,410,876 A * 5/1995 Simko .................. F01N 3/2053
                                                60/288
5,422,331 A * 6/1995 Galligan .............. B01D 53/864
                                                502/241
(Continued)

FOREIGN PATENT DOCUMENTS

JP        60-128920 A      7/1985
JP        2003-269149 A    9/2003
(Continued)

OTHER PUBLICATIONS

Office Action dated Oct. 2, 2018 for the corresponding Japanese Patent Application No. 2015-036509.
(Continued)

*Primary Examiner* — Audrey K Bradley
*Assistant Examiner* — Anthony Ayala Delgado
(74) *Attorney, Agent, or Firm* — Leason Ellis LLP

(57) ABSTRACT

An ammonia generation apparatus is disposed in a stage after a urea water injection unit. The ammonia generation apparatus includes a main body which has an introduction opening for introducing exhaust gas, a discharge opening for discharging the exhaust gas, a first flow passage and a second flow passage which communicate with the introduction opening and the discharge opening and which are separated from each other. The ammonia generation apparatus includes a heating unit disposed in the first flow passage, and a first changeover section which is disposed on one side of the main body where the introduction opening is provided and which can switch the exhaust gas flow passage between the first flow passage and the second flow passage.

9 Claims, 14 Drawing Sheets

(51) Int. Cl.
*F01N 3/20* (2006.01)
*C01C 1/08* (2006.01)
*F01N 13/00* (2010.01)

(52) U.S. Cl.
CPC ......... *F01N 3/2066* (2013.01); *F01N 13/009* (2014.06); *B01D 53/9477* (2013.01); *B01D 2251/2062* (2013.01); *B01D 2251/2067* (2013.01); *B01D 2258/012* (2013.01); *F01N 2240/16* (2013.01); *F01N 2410/00* (2013.01); *F01N 2610/02* (2013.01); *F01N 2610/102* (2013.01); *F01N 2610/105* (2013.01); *Y02T 10/24* (2013.01)

(58) Field of Classification Search
USPC .................................................. 60/272–324
See application file for complete search history.

(56) References Cited

U.S. PATENT DOCUMENTS

| | | | | |
|---|---|---|---|---|
| 7,294,313 | B2* | 11/2007 | Jacob | B01D 53/90 422/148 |
| 7,937,933 | B2* | 5/2011 | Doring | F01N 3/021 60/274 |
| 7,984,609 | B2* | 7/2011 | Doring | F01N 3/0231 60/282 |
| 8,176,731 | B2* | 5/2012 | Doring | F01N 13/011 60/297 |
| 8,220,254 | B2* | 7/2012 | Doring | B01D 53/9431 60/274 |
| 8,268,273 | B2* | 9/2012 | Doring | F01N 3/025 422/105 |
| 2004/0057887 | A1 | 3/2004 | Sun et al. | |
| 2004/0118109 | A1 | 6/2004 | Gladden | |
| 2005/0013756 | A1* | 1/2005 | Amou | B01D 53/9431 423/239.1 |
| 2006/0257303 | A1* | 11/2006 | Telford | B01D 53/9409 423/239.1 |
| 2007/0231232 | A1 | 10/2007 | Lin et al. | |
| 2010/0037607 | A1* | 2/2010 | Doring | F01N 3/0231 60/602 |
| 2010/0055014 | A1 | 3/2010 | Lin et al. | |
| 2010/0236225 | A1* | 9/2010 | Wahl | F01N 3/2066 60/301 |
| 2016/0169074 | A1* | 6/2016 | Clayton, Jr. | F01N 3/208 60/274 |

FOREIGN PATENT DOCUMENTS

| | | |
|---|---|---|
| JP | 2004-514828 A | 5/2004 |
| JP | 2004-197746 A | 7/2004 |
| JP | 2004-353523 A | 12/2004 |
| JP | 2008-190462 A | 8/2008 |
| JP | 2010-127151 A | 6/2010 |
| JP | 2010-261423 A | 11/2010 |
| JP | 2014-159776 A | 9/2014 |
| JP | 2016-121547 A | 7/2016 |

OTHER PUBLICATIONS

Office Action dated Feb. 5, 2019 for the corresponding Japanese Patent Application No. 2015-105069.

\* cited by examiner

AMMONIA GENERATION APPARATUS AND AMMONIA GENERATION CONTROL APPARATUS

This application claims the benefit of Japanese Patent Applications No. 2015-036509 filed Feb. 26, 2015 and No. 2015-105069 filed May 25, 2015, which are incorporated herein by reference in their entity.

FIELD OF THE INVENTION

The present invention relates to an ammonia generation apparatus and an ammonia generation control apparatus.

BACKGROUND OF THE INVENTION

In order to cope with recent regulations on the components of emission gas (exhaust gas) of an internal combustion engine, various types of exhaust gas purification units are disposed in the exhaust pipe passage of the internal combustion engine. One of these exhaust gas purification units is a selective catalytic reduction (SCR) unit, which has been known as an apparatus for reducing and purifying NOx. Such an SCR unit reduces and purifies NOx through use of an NOx reducing catalyst and ammonia produced as a result of hydrolysis of urea water serving as a reducing agent. A temperature of about 200° C. is needed for hydrolysis of urea water, and when exhaust gas is used as a heat source or when a heat source for hydrolyzing urea water is disposed within an exhaust passage, there is a problem in that when the temperature of exhaust gas is low, the urea water cannot be hydrolyzed. A technique for solving such a problem has been proposed (see, for example, Japanese Patent Application Laid-Open (kokai) No. 2014-159776). According to the proposed technique, a heat source is disposed outside the exhaust passage so that even when the exhaust gas temperature is low, the heat for heating the reducing agent is not taken away. Also, there has been proposed a technique of providing a side stream of exhaust gas and supplying urea water to the side stream so as to hydrolyze the urea water through use of the entropy of gas (Japanese Patent Application Laid-Open (kokai) No. 2004-514828).

However, each of the conventional techniques is a technique of making up for heat loss produced by the flow of exhaust gas to thereby provide a temperature environment in which urea water can be hydrolyzed or a technique of efficiently utilizing the thermal energy of exhaust gas. In contrast, there is the fact that recent internal combustion engines have been improved in combustion efficiency, and therefore, the temperature of exhaust gas is unlikely to exceed a temperature at or above which urea water can be hydrolyzed.

Problem to be Solved by the Invention

Accordingly, there has been desired to cause a selective catalytic reduction unit to function from a lower temperature range, independently of the temperature of exhaust gas, to thereby purify NOx even in a low exhaust gas temperature range.

Means for Solving the Problems

The present invention has been accomplished so as to solve the above-described problem and can be realized as the following modes.

SUMMARY OF THE INVENTION

A first mode provides an ammonia generation apparatus which is disposed following a urea water supply section in an exhaust passage of an internal combustion engine. The ammonia generation apparatus according to the first embodiment comprises a main body which has an exhaust gas introduction opening, an exhaust gas discharge opening, and a first flow passage and a second flow passage which communicate with the introduction opening and the discharge opening and which are separated from each other; a heating unit disposed in the first flow passage; and a first changeover section which is disposed adjacent to the introduction opening and can switch a flow passage of the exhaust gas between the first flow passage and the second flow passage.

The ammonia generation apparatus according to the first mode can cause the selective catalytic reduction unit to function from a lower temperature range, independently of the temperature of exhaust gas, to thereby purify NOx even in a low exhaust gas temperature range.

The ammonia generation apparatus according to the first mode may further comprise a second changeover section which is disposed adjacent to the discharge opening and can be switched to close the first flow passage or the second flow passage. In this case, the first flow passage and the second flow passage can be separated from each other more completely.

In the ammonia generation apparatus according to the first mode, the heating unit may have a holding section for holding urea water supplied by the urea water supply section. In this case, urea water can be held in the heating unit.

The ammonia generation apparatus according to the first mode may further comprise a second urea water supply section which is provided on the main body so as to supply urea water directly to the first flow passage. In this case, urea water can be supplied directly to the first flow passage.

A second mode provides an ammonia generation control apparatus. The ammonia generation control apparatus according to the second mode comprises a main body which is disposed in an exhaust passage of an internal combustion engine and which has a first flow passage and a second flow passage separated from each other; a urea water supply section which is disposed on an exhaust gas introduction side of the main body and supplies urea water; a heating unit disposed in the first flow passage; a changeover section which is disposed on the exhaust gas introduction side of the main body and which can switch a flow passage of the exhaust gas between the first flow passage and the second flow passage; and a control section which controls the changeover section so as to switch the flow passage of the exhaust gas to the second flow passage when the internal combustion engine is in a first operation state.

The ammonia generation control apparatus according to the second mode can cause the selective catalytic reduction unit to function from a lower temperature range, independently of the temperature of exhaust gas, to thereby purify NOx even in a low exhaust gas temperature range.

In the ammonia generation control apparatus according to the second mode, the first operation state may be an operation state in which the heating unit is operated or an operation state in which the urea water is hydrolyzed. In this case, without contact with the flow of the exhaust gas, the heating unit can be operated and the urea water can be hydrolyzed.

In the ammonia generation control apparatus according to the second mode, the first operation state may be an operation state in which the exhaust gas has a temperature higher than a predetermined temperature. In this case, the exhaust gas can be caused to flow without passing through the heating unit.

The ammonia generation control apparatus according to the second mode may be configured such that the control section further controls the supply of urea water by the urea water supply section and the operation of the heating unit; and, in the first operation state, after switching the flow passage of the exhaust gas to the second flow passage and operating the heating unit, the control section switches the flow passage of the exhaust gas to the first flow passage and causes the urea water supply section to supply urea water to the first flow passage. In this case, it is possible to operate the heating unit without exposure to the exhaust gas and supply the urea water to the operating heating unit.

The ammonia generation control apparatus according to the second mode may be configured such that the control section further controls the supply of urea water by the urea water supply section and the operation of the heating unit; and, in the first operation state, the control section switches the flow passage of the exhaust gas to the first flow passage and causes the urea water supply section to supply urea water to the first flow passage, and, after completion of the supply of urea water to the first flow passage, the control section switches the flow passage of the exhaust gas to the second flow passage and operates the heating unit. In this case, it is possible to hydrolyze the supplied urea water using the heater unit without exposure to the flow of the exhaust gas.

The ammonia generation control apparatus according to the second mode can be realized as a method for controlling the ammonia generation apparatus or a program for controlling the ammonia generation apparatus.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
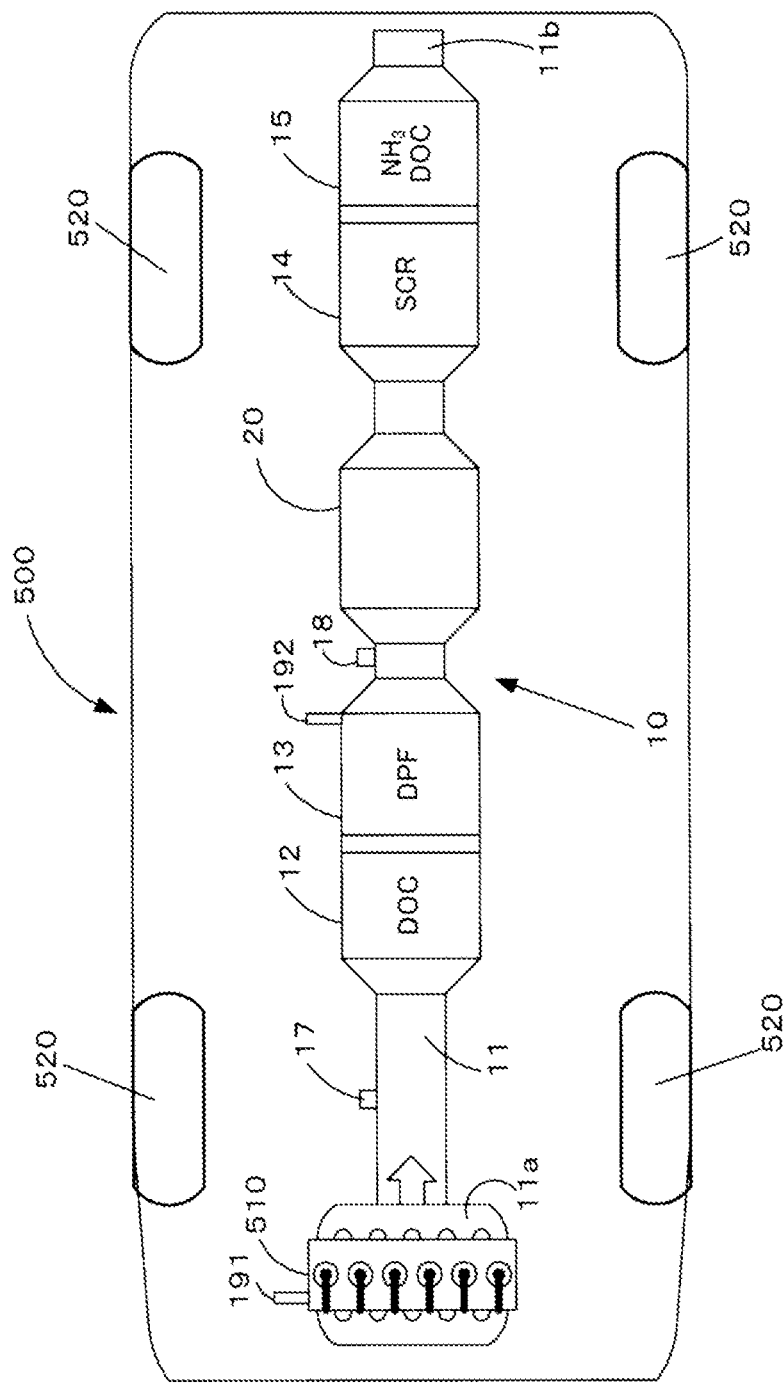
FIG. 1 is an explanatory view schematically showing a vehicle including an ammonia generation apparatus used in a first embodiment.

One mode of a vehicle having an exhaust gas purification system including an ammonia generation apparatus according to the present invention will now be described by taking as an example a vehicle including a diesel engine (internal combustion engine). FIG. 1 is an explanatory view schematically showing a vehicle having an ammonia generation apparatus used in a first embodiment.

First Embodiment

A vehicle 500 includes a diesel engine (hereafter referred to as the "engine") 510, four wheels 520, and an exhaust gas purification system 10. An ammonia generation apparatus 20 according to the present embodiment is provided in the exhaust gas purification system 10. The engine 510 uses light oil as fuel and outputs drive force by means of explosive combustion of the fuel. Also, as a result of the explosive combustion, the engine 510 discharges exhaust gas containing NOx (nitrogen oxides) and PM (particulate matter) to the atmosphere through the exhaust gas purification system 10 provided in the exhaust system of the vehicle 500. A first temperature sensor 191 for detecting the temperature of coolant for cooling the engine 510 is provided on the engine 510. Notably, the configuration of the vehicle shown in FIG. 1 and used in the first embodiment can be used similarly in other embodiments.

The exhaust gas purification system 10 includes various types of exhaust gas purification units provided on an exhaust pipe 11 (exhaust pipe passage). The exhaust pipe 11 is connected to the engine 510 through a manifold 11a on the side toward the engine 510 (on the upstream side with respect to the flow direction of the exhaust gas), and has a muffler end pipe 11b on the furthest downstream side with respect to the flow direction of the exhaust gas. The exhaust gas purification system 10 includes a diesel oxidation catalyst (DOC) 12, a diesel particulate filter (DPF) 13, an ammonia generation apparatus 20, a selective catalytic reduction (SCR) unit 14, and an ammonia slip diesel oxidation catalyst ($NH_3$ DOC) 15 which are provided on the exhaust pipe 11 in this order from the upstream side with respect to the flow direction of the exhaust gas. A fuel injection unit 17 may be disposed on the exhaust pipe 11 to be located upstream of the DOC 12. A urea water injection unit 18 is disposed upstream of the ammonia generation apparatus 20. A temperature sensor 192 is disposed on the discharge side of the DPF 13 of the exhaust gas purification system 10. The temperature sensor 192 may be disposed at a different location, for example, on the ammonia generation apparatus 20 or the SCR unit 14. Notably, the expression "on the exhaust pipe" in the present embodiment encompasses both the case where a relevant unit or the like is provided inside the exhaust pipe and the case where a relevant unit or the like is provided in the midway of the exhaust pipe (a relevant unit or the like constitutes a portion of the exhaust pipe).

The diesel oxidation catalyst 12 carries a noble metal such as platinum (Pt), palladium (Pd), or the like as a catalyst. The diesel oxidation catalyst 12 oxidizes carbon monoxide (CO) and hydrocarbon (HC) which are unburned gas components contained in the exhaust gas and converts them to carbon dioxide ($CO_2$) and water ($H_2O$). Also, the diesel oxidation catalyst 12 oxides nitrogen monoxide (NO) contained in the exhaust gas and coverts it to nitrogen dioxide ($NO_2$).

The diesel particulate filter 13 is a filter which collects the particulates (PM) contained in the exhaust gas by a porous ceramic or metallic member having fine pores or openings. Broadly speaking, the diesel particulate filter 13 is one form of the exhaust gas purification unit. However, in the present specification, attention is paid to the PM collection function of the diesel particulate filter 13, and the diesel particulate filter 13 is regarded as a first particulate collection filter. A metal catalyst such as platinum or the like is applied to the surface of the porous member. The diesel particulate filter 13 is naturally regenerated as follows. In the presence of NOx produced by the diesel oxidation catalyst 12, the particulate matter chemically reacts with the catalyst in an atmosphere of 250 to 300° C. and is converted to carbon dioxide ($CO_2$) and water ($H_2O$), whereby the diesel particulate filter 13 is regenerated. The diesel particulate filter 13 can be regenerated by means of forced regeneration as well. Specifically, fuel is supplied to the diesel oxidation catalyst 12 directly through the fuel injection unit 17 or indirectly from the engine 510 in the exhaust stroke, and hydrocarbon originating from the fuel is catalytically combusted so as to increase the temperature of the exhaust gas to 450° C. or higher, whereby the collected particulate matter is oxidized. Thus, the diesel particulate filter 13 is regenerated.

Notably, the DPF 13 may be a DPF of a type which physically collects the particulate matter and oxidizes the particulate matter by catalytic combustion of hydrocarbon or a plasma DPF which includes a plasma generation unit for generating low-temperature plasma to thereby generate active species (mainly $O_3$) and which supplies the generated active species to the PDF and converts (oxidizes) the components of the particulate matter such as HC and C to $H_2O$ and $CO_2$. Since the plasma DPF can oxidize the particulate matter without using fuel and does not collect the particulate matter physically (by a physical shape), there has been demanded to design the plasma generation unit such that it can generate active species in an amount corresponding to the amount of particulate matter to be processed in advance.

The selective catalytic reduction (SCR) unit 14 is an apparatus including an NOx reducing catalyst which carries a zeolite-based catalyst or a vanadium-based catalyst and selectively reduces NOx. In general, the SCR unit converts the NOx component of the exhaust gas to nitrogen ($N_2$) and water ($H_2O$) through use of the NOx reducing catalyst and ammonia ($NH_3$) produced as a result of thermal decomposition and hydrolysis reaction of the urea water supplied in a stage before the SCR unit. Therefore, the SCR unit which receives the supply of urea water cannot have the NOx reducing function unless its temperature is equal to or higher than a proper temperature (for example, 200° C.) for obtaining ammonia from urea water.

The ammonia generation apparatus 20 is disposed in a stage after the urea water injection unit 18 (on the downstream side thereof with respect to the flow direction of the exhaust gas) and has a heating unit 30 provided therein. The ammonia generation apparatus 20 heats the urea water injected from the urea water injection unit 18 by using the heating unit 30 so as to hydrolyze the urea water to thereby generate (produce) ammonia. The produced ammonia is supplied to the SCR unit 14 and used as a reducing agent for reducing NOx.

The ammonia slip diesel oxidation catalyst 15 carries the same catalyst as the diesel oxidation catalyst 12. The ammonia slip diesel oxidation catalyst 15 oxidizes and decomposes ammonia not used for the reaction at the SCR unit 14 to thereby produce nitrogen or NOx.

Figure 2:
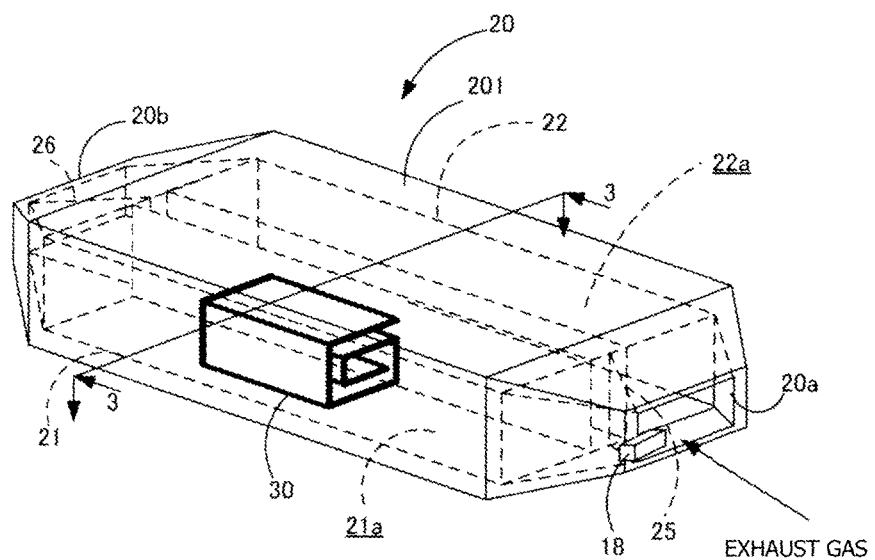
FIG. 2 is an external perspective view schematically showing the structure of the ammonia generation apparatus according to the first embodiment.
Figure 3:
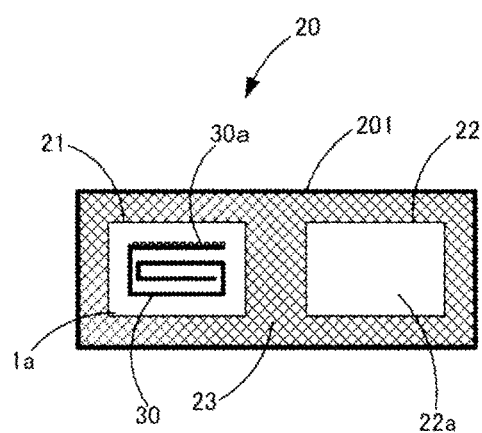
FIG. 3 is a schematic transverse cross-sectional view of the ammonia generation apparatus according to the first embodiment taken along line 3-3 shown in FIG. 2.

The ammonia generation apparatus 20 according to the first embodiment used in the exhaust gas purification system 10 will now be described in detail. FIG. 2 is an external perspective view schematically showing the structure of the ammonia generation apparatus according to the first embodiment. FIG. 3 is a schematic transverse cross-sectional view of the ammonia generation apparatus according to the first embodiment taken along line 3-3 shown in FIG. 2.

The ammonia generation apparatus 20 includes a casing 201 (main body), a first flow passage pipe 21, a second flow passage pipe 22, a heat insulating material 23, a first flow passage changeover valve 25, a second flow passage changeover valve 26, and a heating unit 30. The casing 201 is formed of stainless steel or steel sheet with oxidation prevention treatment performed thereon. The first flow passage pipe 21 defines a first flow passage 21a through which the exhaust gas flows, and the second flow passage pipe 22 defines a second flow passage 22a through which the exhaust gas flows. The first flow passage pipe 21 and the second flow passage pipe 22 are disposed in parallel to each other. The casing 201 has an introduction opening 20a for introducing the exhaust gas into the inside of the casing 201 and a discharge opening 20b for discharging the exhaust gas to the outside. The introduction opening 20a communicates with the first flow passage pipe 21 and the second flow passage pipe 22, and the discharge opening 20b communicates with the first flow passage pipe 21 and the second flow passage pipe 22. Although the first flow passage pipe 21 and the second flow passage pipe 22 have the shape of a hollow rectangular parallelepiped, they may have a cylindrical shape or any other shape.

The urea water injection unit 18, which injects urea water into the interior of the ammonia generation apparatus 20, is disposed upstream of the introduction opening 20a. The urea water injection unit 18 is an apparatus for supplying the urea water stored in an unillustrated urea water tank to the introduction opening 20a (the ammonia generation apparatus 20). In consideration of conversion to ammonia, it is desired that the urea water injection unit 18 supply the urea water in an atomized state. The urea water injection unit 18 injects the urea water supplied under high pressure and stops the injection by opening and closing an injection hole using an electromagnetic or piezo actuator. Notably, the urea water injection unit 18 may be disposed at any location where it can supply the urea water to the first flow passage pipe 21 and the second flow passage pipe, for example, at the introduction opening 20a. In the example of FIG. 1, the urea water injection unit 18 is disposed at a connection section which connects the ammonia generation apparatus 20 and the DPF 13 together, the connection section being located on the upstream side of the introduction opening 20a. Since the ammonia generation apparatus 20 according to the first embodiment is an apparatus which receives the supply of urea water and generates ammonia, it must receive the supply of urea water; however, the ammonia generation apparatus 20 is not required to have an urea water injection unit as part of its structure and may convert the urea water supplied from a separate urea water injection unit to ammonia.

On one side of the casing 201 where the introduction opening 20a is provided, the first flow passage changeover valve 25 is provided so as to switch the flow passage pipe (flow passage) through which the exhaust gas flows, between the first flow passage pipe 21 and the second flow passage pipe 22. Namely, the first flow passage changeover valve 25 closes the second flow passage pipe 22 (the second flow passage 22a) when it causes the exhaust gas to flow to the first flow passage pipe 21 (the first flow passage 21a) (when it opens the first flow passage pipe 21 (the first flow passage 21a)), and closes the first flow passage pipe 21 (the first flow passage 21a) when it causes the exhaust gas to flow to the second flow passage pipe 22 (the second flow passage 22a) (when it opens the second flow passage pipe 22 (the second flow passage 22a).

On the other side of the casing 201 where the discharge opening 20b is provided, the second flow passage changeover valve 26 is provided so as to close the flow passage pipe (flow passage) through which the exhaust gas does not flow, to thereby form a closed space 21b (see FIG. 4) within the flow passage pipe. As will be described later, this closed space can function as a space for temporarily storing the produced ammonia. The second flow passage changeover valve 26 closes the second flow passage pipe 22 (the second flow passage 22a) when the exhaust gas flows into the first flow passage pipe 21 (the first flow passage 21a) and closes the first flow passage pipe 21 (the first flow passage 21a) when the exhaust gas flows into the second flow passage pipe 22 (the second flow passage 22a).

Each of the first and second flow passage changeover valves 25 and 26 may be a changeover valve in which selective switching between the flow passages is realized by swing motion of a plate-shaped valve body about a shaft provided at one end of the valve body as shown in the drawings, a changeover valve in which selective switching between the flow passages is realized by rotation of a rotary valve body about its axis, the rotary valve body having communication passages formed therein, or a changeover valve in which selective switching between the flow passages is realized by straight movement of a plate-shaped valve body. Examples of an actuator for driving the valve body include a motor such as a stepping motor, an electromagnetic actuator, and an actuator using fluid such as air or oil. Notably, as will be described later, there exist cases where the switching between the flow passages is not required to be selective; i.e., exclusive. In such a case, the first flow passage changeover valve 25 is required to introduce the exhaust gas from the introduction opening 20a to both of the first and second flow passage pipes 21 and 22, and the second flow passage changeover valve 26 is required to introduce the exhaust gas from both of the first and second flow passage pipes 21 and 22 to the discharge opening 20b.

The first and second flow passage changeover valves 25 and 26 may be provided for each of the flow passage pipes 21 and 22. In this case, it is possible to close one flow passage pipe and adjust the flow rate of the exhaust gas flowing through the other flow passage pipe. Namely, the exhaust gas flow rates at the two flow passage pipes can be controlled independently.

In the example shown in FIGS. 2 and 3, since the first flow passage pipe 21 has a rectangular parallelepipedic shape, the heating unit 30 also has a rectangular parallelepipedic shape corresponding thereto and has a rectangular spiral cross section. However, the heating unit 30 may have any of other cross sectional shapes, for example, a circular spiral cross sectional shape. The heating unit 30 may be a heating unit disposed within the first flow passage pipe 21 or may be integrally formed on the inner wall surface of the first flow passage pipe 21. The heating unit 30 may be formed by stacking a plurality of flat or corrugated metal plates, or flat and corrugated metal plates, in such a manner that the plates are spaced from one another and the plates themselves generate heat upon energization. In this case, it is desired that a process such as a perforation process (hole forming process) or a roughening process (irregularity forming process) be performed on at least a portion of the metal plates in order to increase their heat generation surface areas or realize a urea water holding section 30a for holding the urea water supplied by the urea water injection unit 18. Notably, in FIG. 3, in order to simplify the illustration, the urea water holding section 30a is depicted only on the surface of a portion of the heating unit 30. The separating spaces between the closely stacked plate-shaped members also function as a urea water holding section for holding the urea water supplied by the urea water injection unit 18. The urea water holding section 30a holds the urea water by means of surface tension at the fine holes or surface irregularities.

A plurality of heating units each of which has a rod-like shape and which are disposed in the first flow passage pipe 21 to extend along the flow direction of the exhaust gas may be used as the heating unit 30. In the case where the heating units have a rod-like shape as well, a urea water holding section can be realized by forming irregularities on the surfaces (outer surfaces) of the heating units. Notably, the heating unit 30 in the present embodiment may be a resistance heating element (heat generation member) whose periphery is not covered with an insulating material and which itself generates heat when electricity is supplied thereto. For example, the heating unit 30 may be a wire-shaped heating member such as Nichrome wire, copper wire, or tungsten wire. Alternatively, the heating unit 30 may be a plate-shaped bare metallic member formed of, for example, stainless steel, cupper, or aluminum. Alternatively, the heating unit 30 may be a heating unit which includes a resistance heating element disposed within a casing and covered with powder of an inorganic insulating material such as magnesia; i.e., the heating unit 30 may be a heating unit generally called "heater." Depending on the application, a non-metallic material (e.g., silicon carbide, carbon, etc.) which is small in heat capacity may be used to form the heating unit 30.

The heating unit 30 according to the present embodiment can function as a heat reservoir. For example, in the case where the heating unit 30 has a form having a spiral cross section as a result of stacking of plates or has a rectangular three-dimensional shape as a result of stacking of plates, since each metal plate can function as a sensible heat storage member, the heating unit 30 functions as a heat reservoir having a predetermined heat capacity.

Further, a heat reservoir may be provided separately from the heating unit 30. In the case where the heat reservoir is a sold heat reservoir which is provided in the first flow passage pipe 21 in such a manner that the heat reservoir extends over the entire transverse cross section (cross section orthogonal to the flow direction of the exhaust gas) of the first flow passage pipe 21, the heat reservoir must have an internal flow passage which allows the exhaust gas to flow therethrough. The heating unit 30 may be embedded in the heat reservoir or disposed in series or in parallel to the heat reservoir. The heat reservoir may have a shape corresponding to the shape of the first flow passage pipe 21 or any other shape. The heat reservoir may be any of a ceramic member, a sintered body of metal powder, a metal honeycomb, an expanded metal, and the like each of which has internal flow passages through which the exhaust gas can flow. Notably, the internal flow passages may be intentionally formed flow passages (for example, straight flow passages) or flow passages (for example, meandering flow passages) formed by openings formed due to the property of the material. Also, the internal flow passages can function as a urea water holding section.

The heat insulating material 23 is disposed or charged in the space between the casing 201 and the first flow passage pipe 21 and the second flow passage pipe 22. For example, a sheet material formed of ceramic, a cylindrical hard ceramic material, or a foamable ceramic material is used as the heat insulating material 23. As a result of provision of the heat insulating material 23, the amount of heat conducted to the metallic casing 201 can be reduced, and the heat insulating efficiency of the ammonia generation apparatus 20 can be maintained at a desired level. Notably, in order to further improve the heat insulation property, the casing 201 may have a double wall structure in which a layer of air is provided between the two walls.

Figure 4:
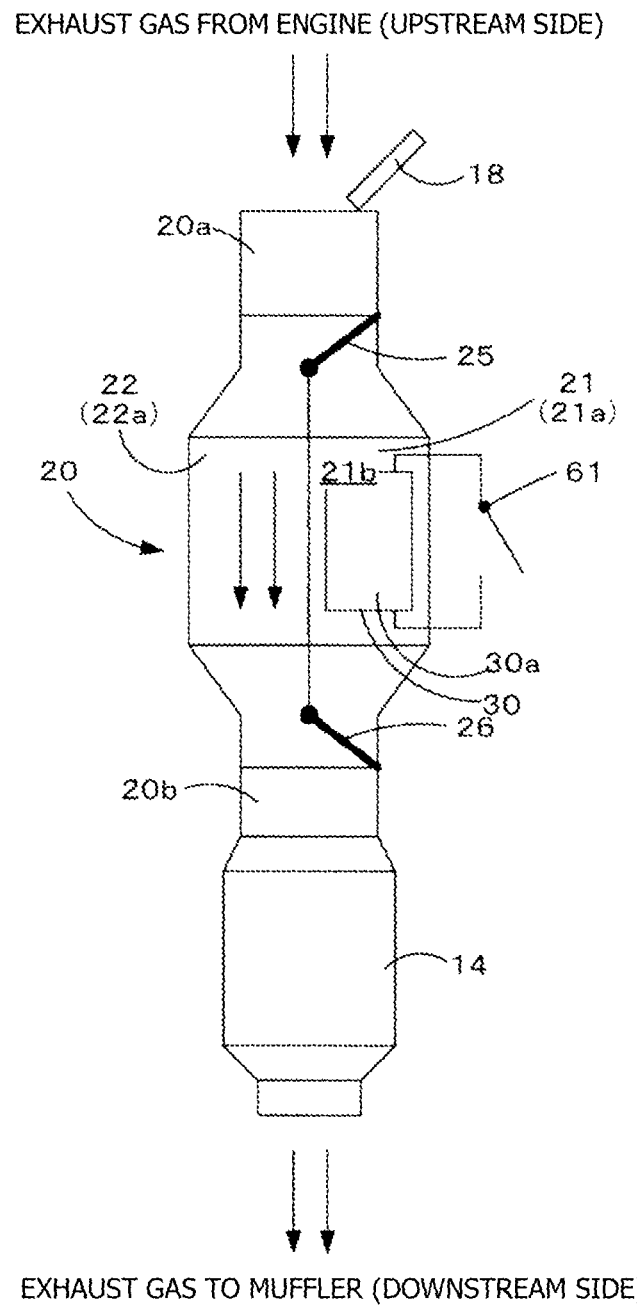
FIG. 4 is an explanatory view showing an operating state of the ammonia generation apparatus according to the first embodiment at the time of cold start.
Figure 5:
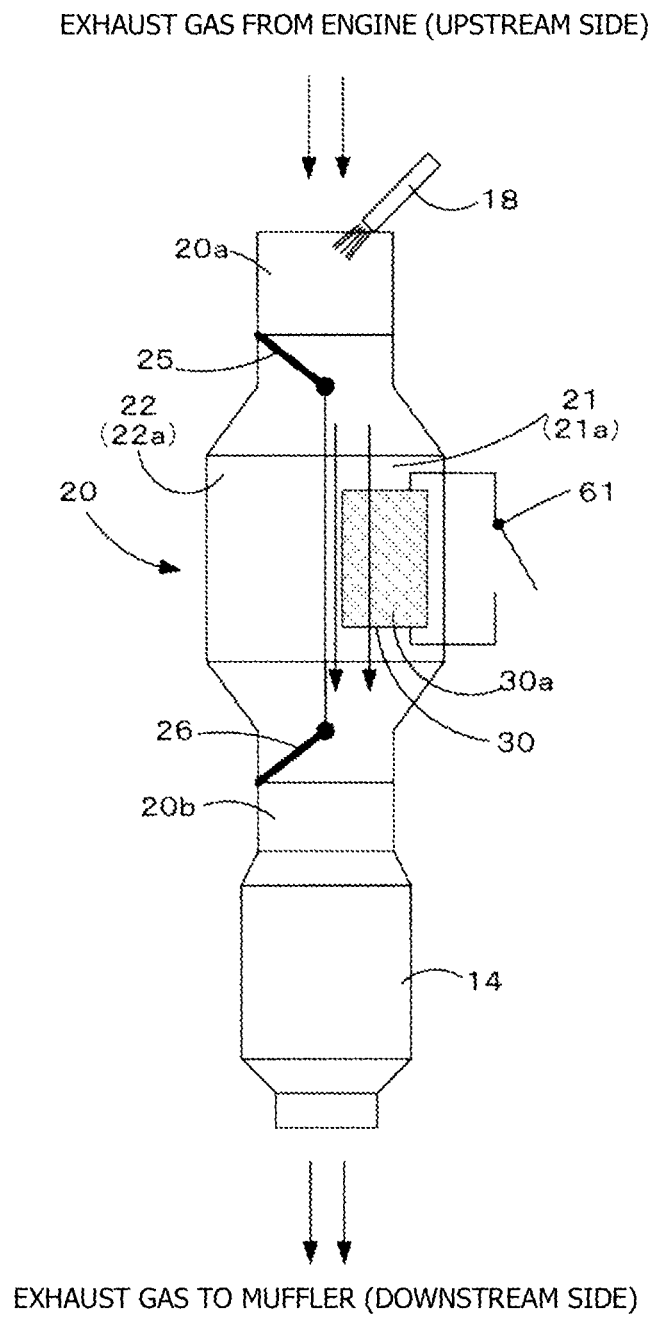
FIG. 5 is an explanatory view showing an operating state of the ammonia generation apparatus according to the first embodiment at the time of warming up.
Figure 6:
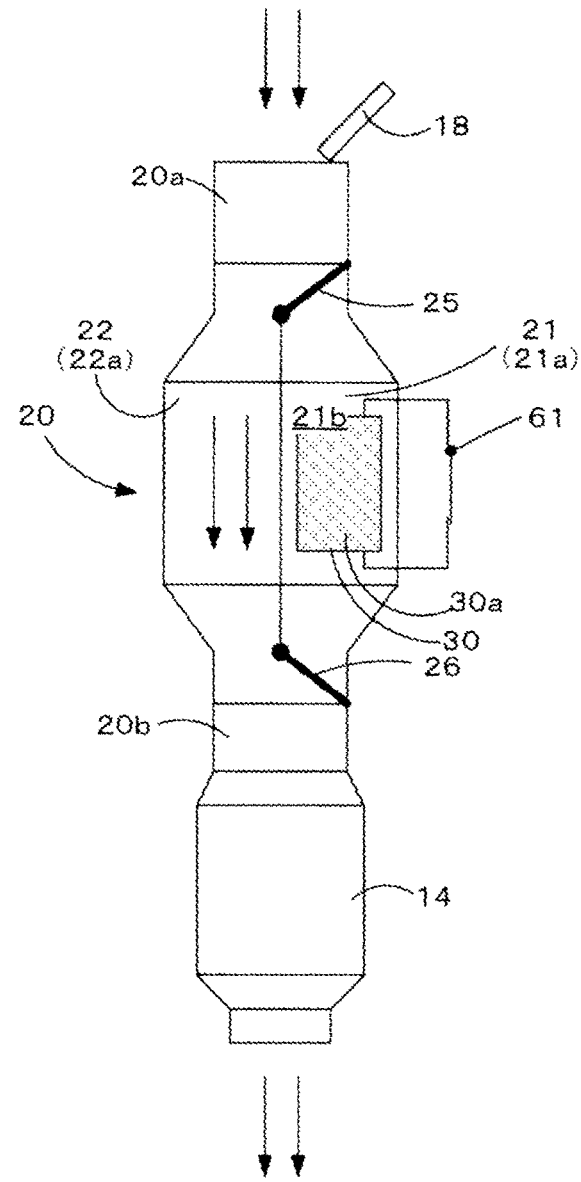
FIG. 6 is an explanatory view showing an operating state of the ammonia generation apparatus according to the first embodiment at the time of warming up.
Figure 7:
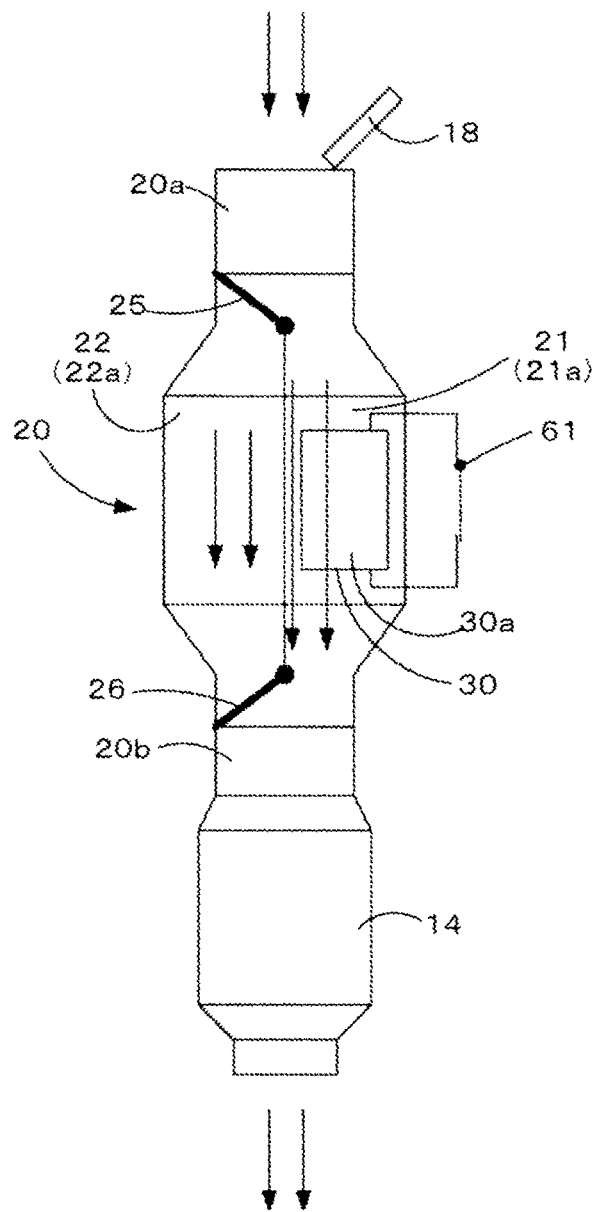
FIG. 7 is an explanatory view showing an operating state of the ammonia generation apparatus according to the first embodiment at the time of warming up.
Figure 8:
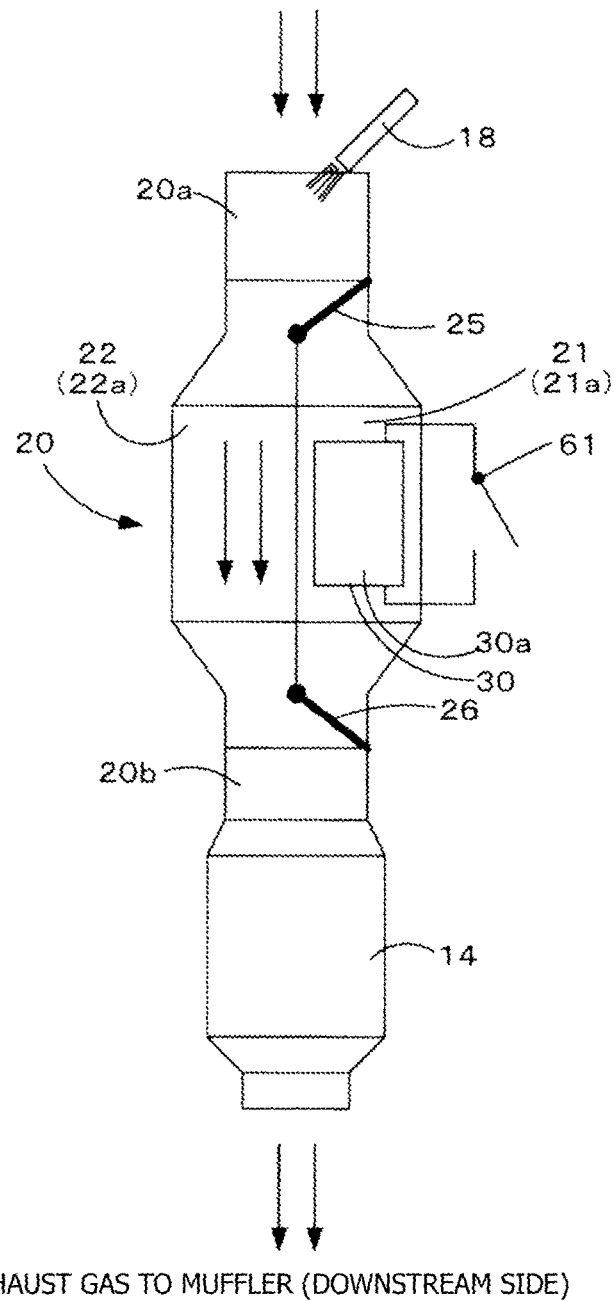
FIG. 8 is an explanatory view showing an operating state of the ammonia generation apparatus according to the first embodiment at the time of ordinary operation.

The switching of the first and second flow passage changeover valves 25 and 26 in accordance with the operation state of the internal combustion engine and the hydrolysis of urea water by the heating unit 30; namely, the operation of the ammonia generation apparatus 20 according to the first embodiment, will be described with reference to FIGS. 4 to 8. FIG. 4 is an explanatory view showing an operating state of the ammonia generation apparatus according to the first embodiment at the time of cold start. FIG. 5 is an explanatory view showing an operating state of the ammonia generation apparatus according to the first embodiment at the time of warming up. FIG. 6 is an explanatory view showing an operating state of the ammonia generation apparatus according to the first embodiment at the time of warming up. FIG. 7 is an explanatory view showing an operating state of the ammonia generation apparatus according to the first embodiment at the time of warming up. FIG. 8 is an explanatory view showing an operating state of the ammonia generation apparatus according to the first embodiment at the time of ordinary operation.

In the present embodiment, a state at the time of cold start, a state at the time of warming up, and a state at the time of ordinary operation (ordinary operation state) are considered as the operation state of the internal combustion engine (the engine). The state at the time of cold start means a state at the time when the engine is started in a state in which the coolant temperature and the oil temperature of the engine are lower than respective warming-up completion temperatures. The state at the time of warming up means the operation state of the engine in a period between the cold start and a point in time at which the coolant temperature and the oil temperature of the engine reach the respective warming-up completion temperatures. The ordinary operation state is the operation state of the engine after the coolant temperature and the oil temperature of the engine have reached the respective warming-up completion temperatures in which the exhaust gas temperature is higher than that at the time of cold start and that at the time of warming up (higher than a predetermined temperature). Notably, the warming-up completion temperatures set for the coolant temperature and the oil temperature of the engine may be properly determined on an engine-by-engine basis. From the viewpoint of the present embodiment, the coolant temperature and the oil temperature of the engine when it discharges exhaust gas of a temperature at which the exhaust gas purification units, including the SCR unit 14, can exhibit their purification actions may be used as the warming-up completion temperatures.

In the case where the operation state of the engine is the state at the time of cold start, as shown in FIG. 4, the first flow passage changeover valve 25 is switched so as to close the first flow passage pipe 21 and lead the exhaust gas from the engine 510 to the second flow passage pipe 22; i.e., the second flow passage 22*a*. The second flow passage changeover valve 26 is switched so as to close the first flow passage pipe 21 to thereby form the closed space 21*b* within the first flow passage pipe 21. Since the exhaust gas temperature at the time of cold start is low, the temperature of the heating unit 30 may drop when the exhaust gas comes into contact with the heating unit 30. In view of this, at the time of cold start, the first flow passage pipe 21 (the first flow passage 21*a*) is closed to form the closed space 21*b*, whereby the exhaust gas is prevented from coming into contact with the heating unit 30.

In the case where the operation state of the engine is the state at the time of warming up, the operation states of the first and second flow passage changeover valves 25 and 26, the operation state of the heating unit 30, and the operation state of the urea water injection unit 18 change as shown in FIGS. 5 through 7. Notably, the expression "the operation state of the engine is the first operation state" means that the engine in at least one of a state in which the heating unit 30 is operated (is caused to generate heat), a state in which the urea water is hydrolyzed (the urea water is converted to ammonia), and a state in which the exhaust gas temperature is higher than a predetermined temperature. The state in which the heating unit 30 is operated and the state in which the urea water is hydrolyzed occur when the engine is warmed up, and the state in which the exhaust gas temperature is higher than the predetermined temperature occurs at the time of ordinary operation after the warming up of the engine.

After the cold start, the operation state of the engine becomes the state at the time of warming up. When the operation state of the engine becomes the state at the time of warming up, first, as shown in FIG. 5, the first flow passage changeover valve 25 is switched so as to close the second flow passage pipe 22 and lead the exhaust gas, introduced from the engine 510 through the introduction opening 20*a*, to the first flow passage pipe 21; i.e., the first flow passage 21*a*. The second flow passage changeover valve 26 is switched so as to close the second flow passage pipe 22 and lead to the discharge opening 20*b* the exhaust gas led to the first flow passage pipe 21; i.e., the first flow passage 21*a*. In this state, the urea water injection unit 18 injects a predetermined amount of urea water. The injected urea water is led, together with the exhaust gas, to the heating unit 30, and, as indicated by a dot pattern, at least a portion of the injected urea water adheres to the surface of the heating unit 30 (is held in the urea water holding section 30a of the heating unit 30). Notably, the injection amount of urea water is properly determined on the basis of, for example, the exhaust gas temperature and the engine load in such a manner that the injection amount increases with the exhaust gas temperature and the engine load.

When the supply of urea water by the urea water injection unit 18 is completed, as shown in FIG. 6, the first flow passage changeover valve 25 is switched so as to close the first flow passage pipe 21 and lead the exhaust gas from the engine 510 to the second flow passage 22a. The operation state of the engine shown in FIG. 6 is the first state, specifically, the state in which the urea water is hydrolyzed (the urea water is converted to ammonia). Notably, since the heating unit 30 is operated, it can be said that the operation state of the engine is the state in which the heating unit 30 is operated (is caused to generate heat). The second flow passage changeover valve 26 is switched so as to close the first flow passage pipe 21 to thereby confine the heating unit 30 within the closed space 21b. In this state, the heating unit 30 is turned on and enters a heating state, whereby the urea water adhering to (held by) the heating unit 30 is converted to ammonia, and ammonia is produced. The temperature realized by the heating unit 30 is equal to or higher than a temperature (e.g., 200° C.) required for hydrolysis of the urea water. Since the ammonia generation apparatus 20 of the present embodiment has the second flow passage changeover valve 26 which closes the downstream end of the first flow passage pipe 21, the produced ammonia is held within the closed space 21b.

When the conversion of the urea water to ammonia by the heating unit 30 (production of ammonia) ends, as shown in FIG. 7, the first flow passage changeover valve 25 is switched so as to close the second flow passage pipe 22 and lead the exhaust gas, introduced from the engine 510 through the introduction opening 20a, to the first flow passage pipe 21. The second flow passage changeover valve 26 is switched so as to close the second flow passage pipe 22 and lead to the discharge opening 20b the exhaust gas led to the first flow passage pipe 21. As a result, the ammonia held in the closed space 21b formed within the first flow passage pipe 21 is supplied to the SCR unit 14 together with the exhaust gas. Since the exhaust gas supplied to the SCR unit 14 is heated by the heating unit 30, the NOx reducing reaction at the SCR unit 14 can be accelerated. Notably, a determination as to whether or not the conversion of the urea water to ammonia ends can be made by determining whether or not a predetermined period of time required for conversion of the supplied urea water to ammonia has elapsed. This required period of time may be constant at all times or may be changed in accordance with the coolant temperature, the exhaust gas temperature, the outside air temperature, etc. In general, the required period of time can be shortened as the coolant temperature, the exhaust gas temperature, the outside air temperature, etc. increase. Notably, in FIG. 7, electric power is supplied to the heating unit 30. However, the supply of electric power to the heating unit 30 may be stopped when a sufficient amount of ammonia has already been supplied.

In the present embodiment, the ammonia generation apparatus 20 is provided in a stage before the SCR unit 14, and the ammonia produced by the ammonia generation apparatus 20 is supplied to the SCR unit 14. Therefore, the SCR unit 14 can exhibit its NOx reducing function from a temperature range lower than 200° C.

When the operation state of the engine changes to the ordinary operation state from the operation state at the time of warming up, as shown in FIG. 8, the first flow passage changeover valve 25 is switched so as to close the first flow passage pipe 21 and lead the exhaust gas from the engine 510 to the second flow passage 22a. The operation state of the engine shown in FIG. 8 is the first state; namely, the state in which the exhaust gas temperature is higher than the predetermined temperature. The second flow passage changeover valve 26 is switched to close the first flow passage pipe 21. The supply of electric power to the heating unit 30 is stopped, whereby the heating by the heating unit 30 ends. The urea water injection unit 18 injects urea water if necessary. As a result, the injected urea water is led to the SCR unit 14 together with the exhaust gas whose temperature is higher than that after the cold start and that at the time of warming up, and is converted to ammonia as a result of hydrolysis.

Figure 9:
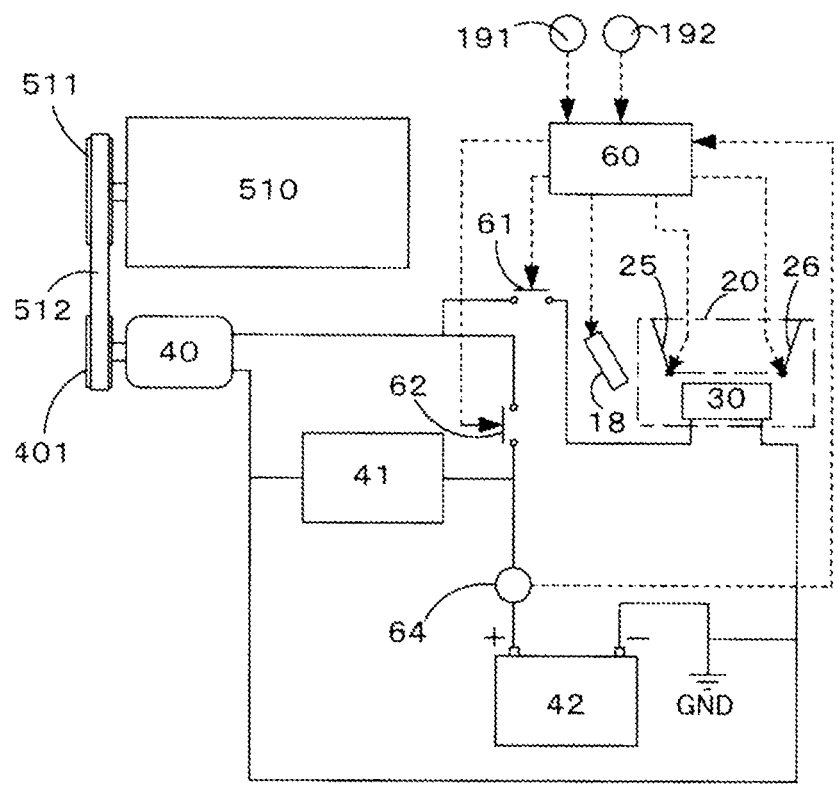
FIG. 9 is a block diagram schematically showing the electrical connections among electrical components in the vehicle having the ammonia generation apparatus according to the first embodiment.

FIG. 9 is a block diagram schematically showing the electrical connections among electrical components in the vehicle having the ammonia generation apparatus 20 according to the first embodiment. The vehicle 500 includes an alternator (generator) 40 which is driven by the drive force of the engine 510. The engine 510 has an engine-side pulley 511 for providing to the alternator 40 the drive force (output) taken out from a crankshaft (not shown). The alternator 40 has an alternator-side pulley 401 for receiving the drive force provided from the engine 510. The engine-side pulley 511 and the alternator-side pulley 401 are mechanically connected by a belt 512, whereby the drive force of the engine 510 is transmitted to the alternator 40 through the belt 512.

The vehicle 500 includes the urea water injection unit 18, the first flow passage changeover valve 25, the second flow passage changeover valve 26, a vehicle accessory 41, the battery 42, a control unit 60, a first relay 61, a second relay 62, the first temperature sensor 191, and the second temperature sensor 192. The first and second flow passage changeover valves 25 and 26, each of which has the above-described structure, are connected to the control unit 60 through control signal lines. The valve body of each flow passage changeover valve is driven by its actuator in accordance with the control signal from the control unit 60, whereby the flow passage of the exhaust gas is switched to the first flow passage pipe 21, to the second flow passage pipe 22, or to the first and second flow passage pipes 21 and 22. Notably, in the present specification, the configuration which includes the control unit 60, the various sensors, and the ammonia generation apparatus 20 will be referred to as an ammonia generation control apparatus 20a.

The control unit 60 functions as a control section for generating ammonia at the ammonia generation apparatus 20. The control unit 60 controls the ammonia generation apparatus 20 by executing not only the open/close control for the first and second flow passage changeover valves 25 and 26 (control for opening and closing the flow passage pipes), but also the control of injection of the urea water by the urea water injection unit 18 (control for allowing and stopping the injection) and the control of energization of the heating unit (control for activating and deactivating the heating unit 30).

The vehicle accessary 41 is an accessary which is used when the vehicle travels and which is driven by (consumes) the electric power output from the alternator 40 or the electric power stored in the battery 42. Examples of the vehicle accessary 41 include head lamps, an audio system, a navigation system, and an electric heater.

The output terminal of the alternator 40 is electrically connected to the heating unit 30 through the first relay 61.

Also, the output terminal of the alternator 40 is electrically connected to the vehicle accessary 41 through the second relay 62 and is electrically connected to the positive terminal (+) of the battery 42 through an ammeter 64. Notably, a DC/DC converter for voltage step up or voltage step down may be disposed in a wiring path extending from the alternator 40 to the vehicle accessary 41 and the battery 42. The ground-side terminals of the alternator 40, the vehicle accessary 41, and the heating unit 30 are electrically connected to the negative terminal (−) of the battery 42 through the body ground.

The first relay 61 is a switch which turns the heating unit 30 on and off; namely, allows and stops the supply of electric power to the heating unit 30. The second relay 62 is a switch which allows and stops the supply of electric power generated by the alternator 40 to the accessary 41 and the battery 42. The first and second relays 61 and 62 are connected to the control unit 60 through control signal lines and are turned on (closed) and turned off (opened) by the control signals from the control unit 60. The ammeter 64 detects the output current of the battery 42 and provides the detected output current to the control unit 60 through a signal line. The first temperature sensor 191, which is used to detect the temperature of the coolant for cooling the engine 510, and the second temperature sensor 192, which is used to detect the temperature of the exhaust gas introduced into the ammonia generation apparatus 20, are both connected to the control unit 60 through signal lines.

Figure 10:
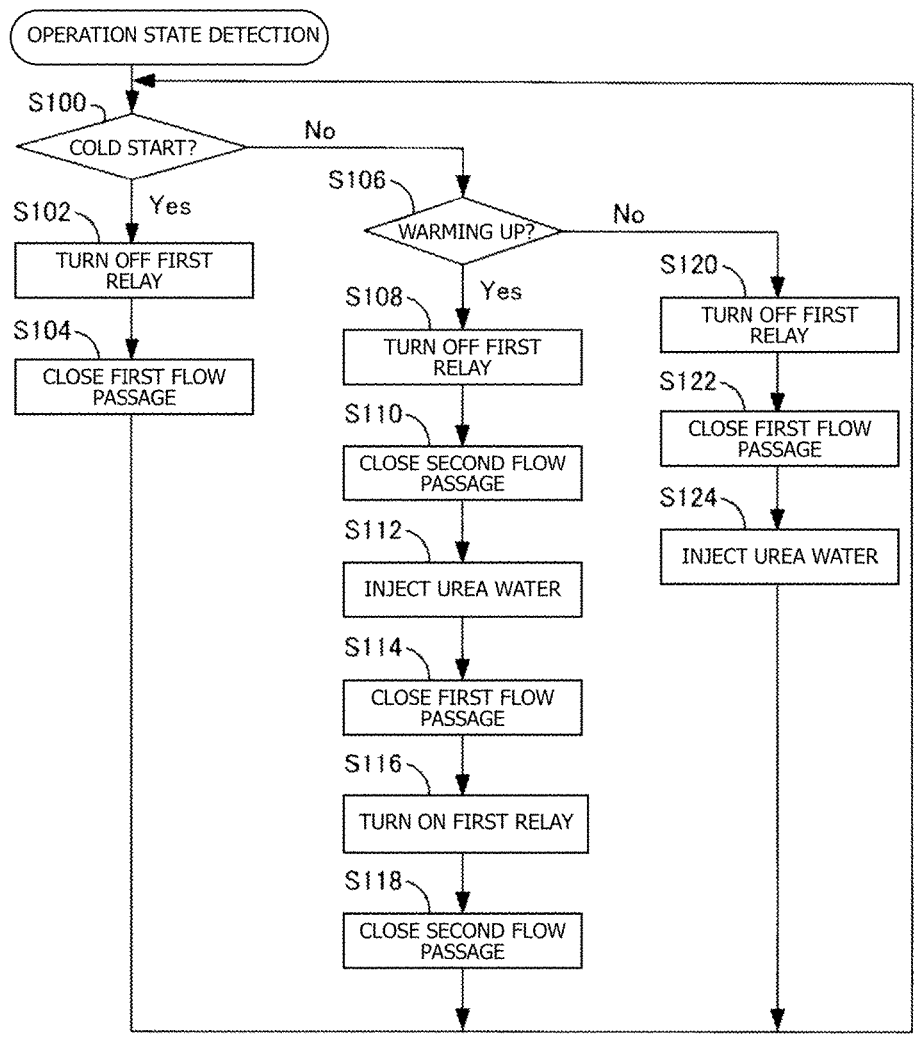
FIG. 10 is a flowchart showing a processing routine for controlling the operation of the ammonia generation apparatus in the first embodiment.

Operation control for the ammonia generation apparatus 20 in the first embodiment will be described with reference to FIG. 10. FIG. 10 is a flowchart showing a processing routine for controlling the operation of the ammonia generation apparatus in the first embodiment. The present processing routine is repeatedly executed by the control unit 60 at predetermined timings and time intervals. Notably, the control unit 60 includes at least a central processing unit (CPU), memories, and an input/output interface for exchanging control signals and detection signals with external devices. The CPU, the memories, and the input/output interface are not shown in the drawings.

The control unit 60 starts the present processing routine when the vehicle is started, and detects the operation state of the engine using various sensors provided on the vehicle. Notably, the start of the vehicle means that the ignition key position is switched to the ON position; i.e., means the state before the ignition key position is switched to the start position; i.e., the engine 510 is started. For example, the control unit 60 can judge the operation state of the engine (i.e., the state at the time of cold start, the state at the time of warming up, or the ordinary operation state) on the basis of input signals input from the first temperature sensor 191 for detecting the coolant temperature, the second temperature sensor for detecting the exhaust gas temperature, an outside air temperature sensor, and an oil temperature sensor. In general, the state at the time of cold start means a state in which the temperature of the engine 510 (the coolant temperature) is equal to or lower than the outside air temperature, and the engine 510 usually enters the state at the time of cold start when the engine 510 is started for the first time in a day. The state at the time of warming up means an operation state before the coolant temperature and the oil temperature reach predetermined respective temperatures. For example, the temperature of the coolant at which the clearance between each piston and the corresponding cylinder becomes an expected size is used as the predetermined temperature for the coolant, and the temperature of the oil at which the oil exhibits an expected lubricating performance (viscosity) is used as the predetermined temperature for the oil.

The control unit 60 judges whether or not the operation state of the engine is the state at the time of cold start (step S100). In the case where the control unit 60 judges that the operation state of the engine is the state at the time of cold start (step S100: Yes), the control unit 60 turns off the first relay 61 (step S102). Namely, the heating unit 30 is electrically disconnected from the alternator 40 and the battery 42 and does not generate heat (does not operate). The control unit 60 closes the first flow passage pipe 21 (the first flow passage 21*a*) (step S104) and returns to the detection of the operation state. When the control unit 60 closes the first flow passage pipe 21, the control unit 60 sends control signals to the first flow passage changeover valve 25 and the second flow passage changeover valve 26 so as to switch the valve positions of the first flow passage changeover valve 25 and the second flow passage changeover valve 26 such that the first flow passage pipe 21 is closed as shown in FIG. 4. As a result, communication is established between the introduction opening 20*a* and the second flow passage pipe 22 (the second flow passage 22*a*), and the introduced exhaust gas flows through the second flow passage 22*a* and is led to the discharge opening 20*b*. Namely, the heating unit 30 is prevented from being exposed to the flow of the exhaust gas, whereby the hydrolysis of the urea water by the heating unit 30, which will be described later, can be performed efficiently. Notably, the judgment as to whether or not the operation state of the engine is the state at the time of cold start by the control unit 60 may be performed before or after the startup of the engine performed after the ignition key position has been switched to the ON position.

In the case where the control unit 60 judges that the operation state of the engine is not the state at the time of cold start (step S100: No), the control unit 60 judges whether or not the operation state of the engine is the state at the time of warming up (step S106). In the case where the control unit 60 judges that the operation state of the engine is the state at the time of warming up (step S106: Yes), the control unit 60 turns off the first relay 61 (step S108) so as to electrically disconnect the heating unit 30 from the alternator 40 and the battery 42, to thereby bring the heating unit 30 into the deactivated state. The control unit 60 closes the second flow passage 22*a* (step S110) and causes the urea water injection unit 18 to inject urea water (step S112). Specifically, the control unit 60 sends control signals to the first flow passage changeover valve 25 and the second flow passage changeover valve 26 so as to switch the valve positions of the first flow passage changeover valve 25 and the second flow passage changeover valve 26 so that the second flow passage pipe 22 (the second flow passage 22*a*) is closed as shown in FIG. 5. As a result, communication is established between the introduction opening 20*a* and the first flow passage pipe 21 (the first flow passage 21*a*), whereby the introduced exhaust gas flows through the first flow passage 21*a* and is led to the discharge opening 20*b*. The urea water supplied to the introduction opening 20*a* by the urea water injection unit 18 is led to the first flow passage 21*a* by the exhaust gas, whereby at least a portion of the urea water adheres to the heating unit 30 and is held thereby. As having been described already, it is desired that the urea water holding section 30*a* be formed in the heating unit 30. In this case, the urea water introduced into the heating unit 30 is held at the urea water holding section 30*a* by means of surface tension.

When injection of the urea water of a predetermined amount is completed, the control unit 60 closes the first flow passage 21a (step S114) and turns on the first relay 61 (step S116). The control unit 60 sends control signals to the first flow passage changeover valve 25 and the second flow passage changeover valve 26 so as to switch the valve positions of the first flow passage changeover valve 25 and the second flow passage changeover valve 26 such that the first flow passage 21a is closed as shown in FIG. 6. As a result, the closed space 21b closed (defined) by the first and second flow passage changeover valves 25 and 26 is formed in the first flow passage pipe 21 (the first flow passage 21a). As a result of the first relay 61 being turned on in this state, the alternator 40 is electrically connected to the heating unit 30, whereby the electric power generated by the alternator 40 is supplied to the heating unit 30. The heating unit 30 having received the supply of the electric power generates heat so as to heat the held urea water, to thereby generate ammonia through hydrolysis. Since the heating unit 30 is present in the closed space 21b defined by the first and second flow passage changeover valves 25 and 26, the generated (produced) ammonia is held in the closed space 21b.

After elapse of a time within which all or at least a predetermined amount of the urea water held in the heating unit 30 is converted to ammonia, the control unit 60 closes the second flow passage 22a (step S118) and returns to the detection of the operation state. The control unit 60 sends control signals to the first flow passage changeover valve 25 and the second flow passage changeover valve 26 so as to switch the valve positions of the first flow passage changeover valve 25 and the second flow passage changeover valve 26 so that the second flow passage 22a is closed as shown in FIG. 7. As a result, communication is established between the introduction opening 20a and the first flow passage 21a, whereby the introduced exhaust gas flows through the first flow passage 21a and is led to the discharge opening 20b. The exhaust gas flowing through the first flow passage 21a urges the ammonia held in the first flow passage 21a (the closed space 21b) to flow, whereby the held ammonia is supplied to the SCR unit 14 through the discharge opening 20b. Since ammonia (not the urea water) is supplied to the SCR unit 14, the SCR unit 14 can realize NOx reduction at a lower exhaust gas temperature range. Notably, the time within which all or at least a predetermined amount of the urea water held in the heating unit 30 is converted to ammonia may be experimentally determined on the basis of the volume of the closed space 21b, the heat generation performance of the heating unit 30, the amount of urea water which can be held by the heating unit 30, etc.

In the case where the control unit 60 judges that the operation state of the engine is not the state at the time of warming up (step S106: No), it judges that the operation state of the engine is the ordinary operation state, and turns off the first relay 61 (step S120). As a result of the first relay 61 being turned off, the heating unit 30 is electrically disconnected from the alternator 40 and the battery 42, whereby the heating unit 30 is brought into the deactivated state. The control unit 60 closes the first flow passage 21a (step S122), causes the urea water injection unit 18 to inject urea water (step S124), and returns to the detection of the operation state. The control unit 60 sends control signals to the first flow passage changeover valve 25 and the second flow passage changeover valve 26 so as to switch the valve positions of the first flow passage changeover valve 25 and the second flow passage changeover valve 26 so that the first flow passage 21a is closed as shown in FIG. 8. As a result, communication is established between the introduction opening 20a and the second flow passage pipe 22 (the second flow passage 22a), whereby the introduced exhaust gas flows through the second flow passage 22a and is led to the discharge opening 20b. The urea water supplied to the introduction opening 20a by the urea water injection unit 18 is led to the second flow passage 22a by the exhaust gas and is supplied, together with the exhaust gas, to the SCR unit 14 through the discharge opening 20b. Since the temperature of the exhaust gas in the ordinary operation state is equal to or higher than the predetermined temperature, urea water can be converted to ammonia by the heat of the exhaust gas.

In the above-described ammonia generation apparatus 20 according to the first embodiment, urea water is held by the heating unit 30, the closed space 21b which includes the heating unit 30 is formed as a result of the first flow passage 21a being closed by the first flow passage changeover valve 25 and the second flow passage changeover valve 26, and the heating unit 30 is caused to generate heat. Accordingly, ammonia can be generated efficiently from the urea water without being affected by the temperature and flow of the exhaust gas. Namely, it becomes possible to convert all the urea water to ammonia, while reducing the amount of electric power required for the generation of heat by the heating unit 30, to thereby stabilize the amount of ammonia supplied to the SCR unit 14. Also, since ammonia can be held in the closed space 21b, leakage of ammonia which is unnecessary can be prevented or restrained, and the amount of ammonia supplied to the SCR unit 14 can be adjusted. Further, since the ammonia slip diesel oxidation catalyst 15 is provided in a stage after the ammonia generation apparatus 20, even when ammonia leaks out from the closed space 21b, the leaked ammonia is not released to the outside of the vehicle.

In the ammonia generation apparatus 20 according to the first embodiment, instead of urea water, ammonia is supplied to the SCR unit 14. Therefore, NOx reduction can be realized in a temperature range lower than the operating temperature which is conventionally required for operation of the SCR unit 14. Namely, in the case of a conventional method in which urea water is supplied to the SCR unit, the temperature of the SCR unit itself and the temperature of exhaust gas supplied to the SCR unit must be equal to or higher than a temperature (for example, 200° C.) at which ammonia can be produced by hydrolyzing the urea water. Meanwhile, the NOx reducing catalyst provided in the SCR unit exhibits NOx reducing performance from a lower temperature (for example, about 120° C.) although the amount of ammonia required for reduction increases and the NOx reducing rate (reduction rate; i.e., decreasing rate) lowers. Accordingly, when, instead of urea water, ammonia is supplied directly to the SCR unit 14 through use of the ammonia generation apparatus 20 according to the first embodiment, it becomes possible to supply an amount of ammonia necessary for low temperature reduction and to realize NOx reduction in a lower operating temperature range.

There has been known that, as a result of improved combustion efficiency and reduced fuel consumption, the temperature of the exhaust gas discharged from the engine 510 tends to become lower than 200° C. when the vehicle travels through an urban area; i.e., in an operation range within which the load of the engine is at a low to intermediate level (hereinafter the "low-to-intermediate load operation range"). When the ammonia generation apparatus 20 according to the first embodiment is used, NOx reduction becomes possible even in the low-to-intermediate load operation range, and exhaust gas purification can be realized in a wider operation range as compared with the case where a conventional apparatus is used.

In general, the amount of ammonia which the SCR unit (NOx reducing catalyst) can adsorb tends to increase as the temperature of the SCR unit decreases. Therefore, when ammonia is supplied to the SCR unit 14 of low temperature, the supplied ammonia is adsorbed by the SCR unit 14. Accordingly, even when the exhaust gas temperature is low, the amount of ammonia necessary for NOx reduction can be supplied.

In the ammonia generation apparatus 20 according to the first embodiment, when ammonia is supplied to the SCR unit 14, the exhaust gas flowing through the first flow passage pipe 21 and heated by the heating unit 30 is supplied to the SCR unit 14. Accordingly, even in the low-to-intermediate load operation range, the exhaust gas of higher temperature can be supplied to the SCR unit 14 without being affected by the exhaust gas of low temperature which does not flow through the heating unit 30, whereby the efficiency of NOx reduction at the SCR unit 14 can be improved.

Second Embodiment

Figure 11:
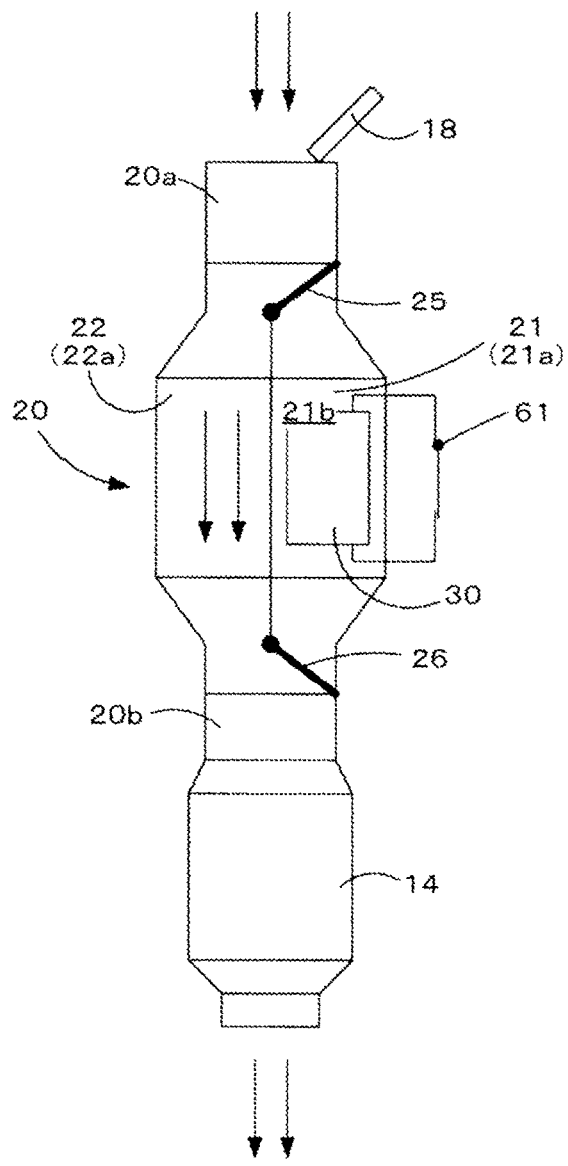
FIG. 11 is an explanatory view showing an operating state of an ammonia generation apparatus according to a second embodiment at the time of warming up.
Figure 12:
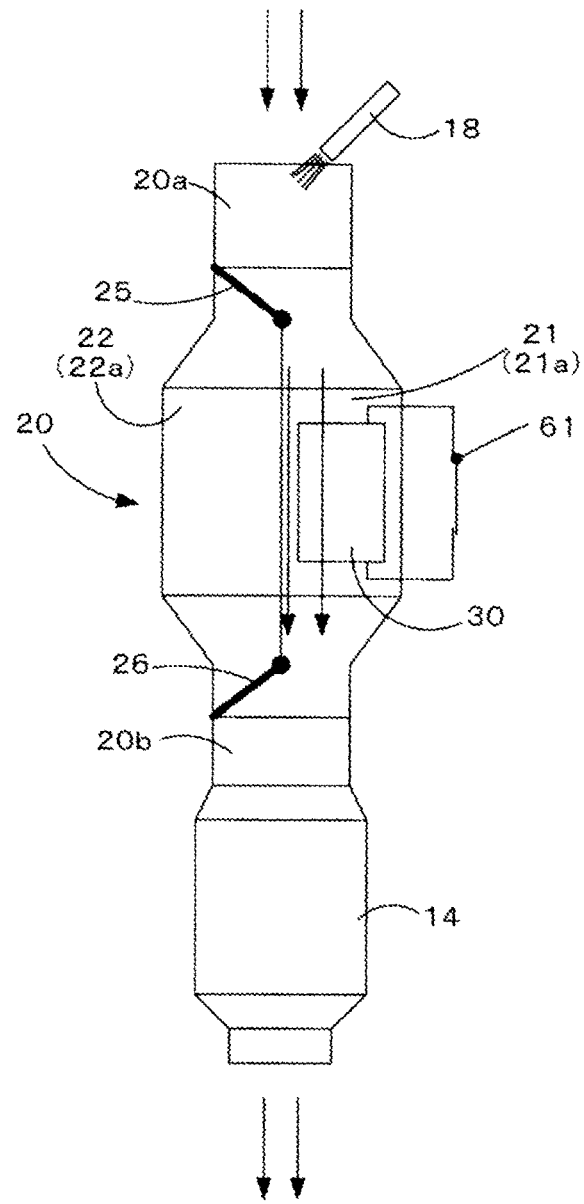
FIG. 12 is an explanatory view showing an operating state of the ammonia generation apparatus according to the second embodiment at the time of warming up.
Figure 13:
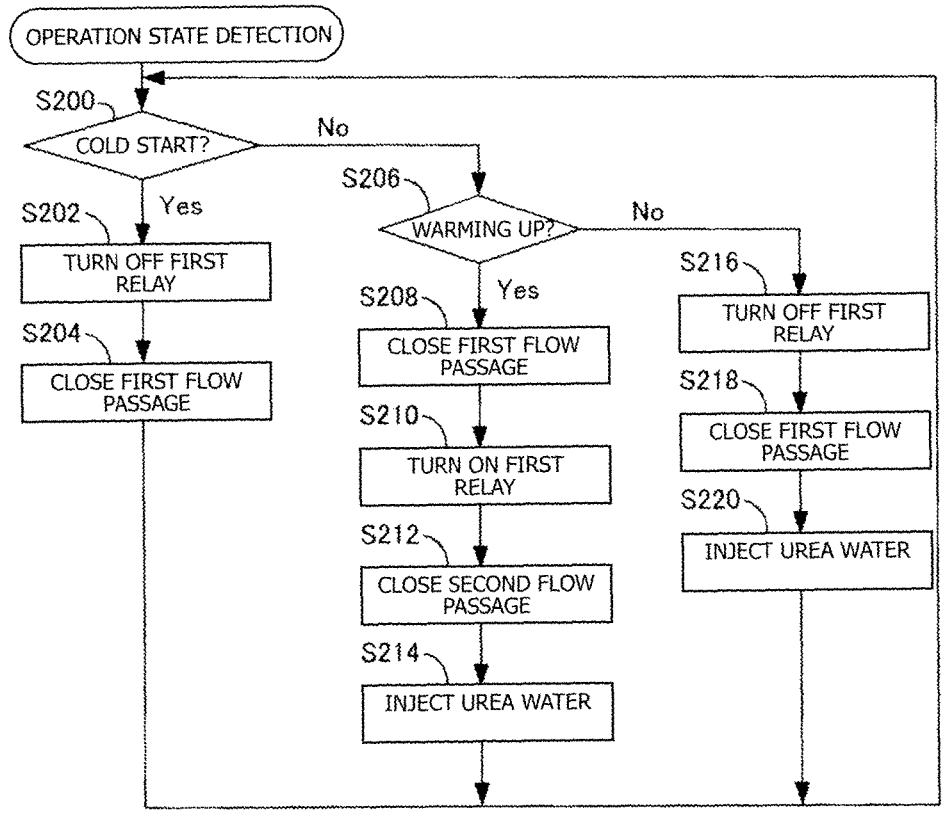
FIG. 13 is a flowchart showing a processing routine for controlling the operation of the ammonia generation apparatus in the second embodiment.

An ammonia generation apparatus 20 according to a second embodiment will be described with reference to FIGS. 11 through 13. FIG. 11 is an explanatory view showing an operating state of the ammonia generation apparatus according to the second embodiment at the time of warming up. FIG. 12 is an explanatory view showing an operating state of the ammonia generation apparatus according to the second embodiment at the time of warming up. FIG. 13 is a flowchart showing a processing routine for controlling the operation of the ammonia generation apparatus in the second embodiment. The present processing routine is repeatedly executed by the control unit 60 at predetermined timings and time intervals. Notably, although the procedure of generating ammonia in the ammonia generation apparatus 20 according to the second embodiment differs from that in the ammonia generation apparatus 20 of the first embodiment, the components of the ammonia generation apparatus 20 according to the second embodiment are identical to those of the ammonia generation apparatus 20 of the first embodiment. Therefore, the components of the ammonia generation apparatus 20 according to the second embodiment are denoted by the same reference numerals as those used in the first embodiment, and their descriptions will be omitted.

Since a portion of the operating state of the ammonia generation apparatus 20 according to the second embodiment is identical to that of the ammonia generation apparatus 20 according to the first embodiment, its detailed description will be omitted. In the case where the operation state of the engine is the state at the time of cold start, as shown in FIG. 4, the first flow passage changeover valve 25 is switched so as to close the first flow passage pipe 21 and lead the exhaust gas from the engine 510 to the second flow passage pipe 22. The second flow passage changeover valve 26 is switched so as to close the first flow passage pipe 21 to thereby form the closed space 21b within the first flow passage pipe 21.

In the case where the operation state of the engine is the state at the time of warming up, the operation states of the first and second flow passage changeover valves 25 and 26, the operation state of the heating unit 30, and the operation state of the urea water injection unit 18 change as shown in FIGS. 11 and 12. Notably, the ammonia generation apparatus 20 according to the second embodiment differs from the ammonia generation apparatus 20 according to the first embodiment in the timing at which the heating unit 30 is caused to generate heat.

Specifically, in the ammonia generation apparatus 20 according to the first embodiment, the heating unit 30 is caused to generate heat after the urea water is suppled. In contrast, in the ammonia generation apparatus 20 according to the second embodiment, the urea water is suppled after the heating unit 30 is caused to generate heat. Notably, like the first embodiment, the heating unit 30 may have the urea water holding section 30a.

In the second embodiment as well, the expression "the operation state of the engine is the first operation state" means that the engine in at least one of the state in which the heating unit 30 is operated (is caused to generate heat), the state in which the urea water is hydrolyzed (the urea water is converted to ammonia), and the state in which the exhaust gas temperature is higher than the predetermined temperature. The state in which the heating unit 30 is operated and the state in which the urea water is hydrolyzed occur when the engine is warmed up, and the state in which the exhaust gas temperature is higher than the predetermined temperature occurs at the time of ordinary operation after the warming up of the engine.

After the operation state of the engine has become the state at the time of warming up, the first and second flow passage changeover valves 25 and 26, the heating unit 30, and the urea water injection unit 18 of the ammonia generation apparatus 20 according to the second embodiment enter the operation states shown in FIG. 11. Namely, the first flow passage changeover valve 25 is switched so as to close the first flow passage pipe 21 and lead the exhaust gas from the engine 510 to the second flow passage pipe 22. The second flow passage changeover valve 26 is switched so as to close the first flow passage pipe 21 to thereby confine the heating unit 30 within the closed space 21b. In this state, the heating unit 30 is turned on and enters a heating state. The operation state of the engine shown in FIG. 11 is the first operation state; namely, the state in which the heating unit 30 is operated (is caused to generate heat). Notably, in the second embodiment, no urea water is held by the heating unit 30 (a dot pattern is not depicted), and the supply of electric power to the heating unit 30 is the supply of electric power for pre-heating. The pre-heating is performed for a predetermined time until the temperature of the heating unit 30 or the temperature within the closed space 21b becomes equal to or higher than the temperature (for example, 200° C.) necessary for hydrolysis of the urea water. Notably, this predetermined time may be determined in advance on the basis of the performance of the heating unit 30, the volume of the closed space 21b, etc. and may be corrected in consideration of the outside air temperature or the like.

When the above-mentioned predetermined time has elapsed after the start of the supply of electric power to the heating unit 30, as shown in FIG. 12, the first flow passage changeover valve 25 is switched so as to close the second flow passage pipe 22 and lead the exhaust gas, introduced from the engine 510 through the introduction opening 20a, to the first flow passage pipe 21; i.e., the first flow passage 21a. The second flow passage changeover valve 26 is switched so as to close the second flow passage pipe 22 and lead to the discharge opening 20b the exhaust gas led to the first flow passage pipe 21; i.e., the first flow passage 21a. In this state, the urea water injection unit 18 injects a predetermined amount of urea water. As a result, the injected urea water is led, together with the exhaust gas, to the heating unit 30, and at least a portion of the urea water is heated by the heating unit 30 and is converted to ammonia as a result of hydrolysis. The ammonia generated or converted from the urea water is supplied to the SCR unit 14 together with the exhaust gas. Since the exhaust gas supplied to the SCR unit 14 is heated by the heating unit 30, the NOx reducing reaction at the SCR unit 14 can be accelerated. Notably, the injection amount of the urea water may be properly determined on the basis of the exhaust gas temperature and the engine load such that the injection amount increases with the exhaust gas temperature and the engine load.

In the present embodiment, the ammonia generation apparatus 20 is provided in a stage before the SCR unit 14 and the ammonia generated by the ammonia generation apparatus 20 is supplied to the SCR unit 14. Therefore, the SCR unit 14 can exhibit its NOx reducing function from a temperature range lower than 200° C.

When the operation state of the engine has changed to the ordinary operation state from the operation state at the time of warming up, the first and second flow passage changeover valves 25 and 26, the heating unit 30, and the urea water injection unit 18 of the ammonia generation apparatus 20 according to the second embodiment enter the operation states shown in FIG. 8. The operation state of the engine shown in FIG. 8 is the first operation state; namely, the state in which the exhaust gas temperature is higher than the predetermined temperature.

The operation control for the ammonia generation apparatus 20 in the second embodiment will be described with reference to FIG. 13. The present processing routine is repeatedly executed by the control unit 60 at predetermined timings and time intervals.

The control unit 60 starts the present processing routine when the vehicle is started, and detects the operation state of the engine using various sensors provided on the vehicle. The detection of the operation state of the engine has already been described in the first embodiment.

The control unit 60 judges whether or not the operation state of the engine is the state at the time of cold start (step S200). In the case where the control unit 60 judges that the operation state of the engine is the state at the time of cold start (step S200: Yes), the control unit 60 turns off the first relay 61 (step S202). Namely, the heating unit 30 is electrically disconnected from the alternator 40 and the battery 42 and does not generate heat (does not operate). The control unit 60 closes the first flow passage 21a (step S204) and returns to the detection of the operation state. When the control unit 60 closes the first flow passage 21a, the control unit 60 sends control signals to the first flow passage changeover valve 25 and the second flow passage changeover valve 26 so as to switch the valve positions of the first flow passage changeover valve 25 and the second flow passage changeover valve 26 such that the first flow passage pipe 21 is closed as shown in FIG. 4. As a result, communication is established between the introduction opening 20a and the second flow passage pipe 22 (the second flow passage 22a), and the introduced exhaust gas flows through the second flow passage 22a and is led to the discharge opening 20b.

In the case where the control unit 60 judges that the operation state of the engine is not the state at the time of cold start (step S200: No), the control unit 60 judges whether or not the operation state of the engine is the state at the time of warming up (step S206). In the case where the control unit 60 judges that the operation state of the engine is the state at the time of warming up (step S206: Yes), the control unit 60 closes the first flow passage 21a (step S208) and turns on the first relay 61 (step S210). Specifically, the control unit 60 sends control signals to the first flow passage changeover valve 25 and the second flow passage changeover valve 26 so as to switch the valve positions of the first flow passage changeover valve 25 and the second flow passage changeover valve 26 such that the first flow passage 21a is closed as shown in FIG. 6. As a result, the closed space 21b closed (defined) by the first and second flow passage changeover valves 25 and 26 is formed in the first flow passage 21a. As a result of the first relay 61 being turned on in this state, the alternator 40 is electrically connected to the heating unit 30, whereby the electric power generated by the alternator 40 is supplied to the heating unit 30. The heating unit 30 having received the supply of the electric power generates heat, whereby pre-heating is performed.

When the time over which electric power has been supplied to the heating unit 30 exceeds a predetermined time, the control unit 60 closes the second flow passage 22a (step S212). The control unit 60 causes the urea water injection unit 18 to inject urea water (step S214), and returns to the detection of the operation state. Specifically, the control unit 60 sends control signals to the first flow passage changeover valve 25, the second flow passage changeover valve 26, and the urea water injection unit 18 so as to switch the valve positions of the first flow passage changeover valve 25 and the second flow passage changeover valve 26 such that the second flow passage 22a is closed, and so as to cause the urea water injection unit 18 to inject urea water, as shown in FIG. 12. As a result, communication is established between the introduction opening 20a and the first flow passage 21a, whereby the introduced exhaust gas flows through the first flow passage 21a and is led to the discharge opening 20b. The urea water supplied to the introduction opening 20a by the urea water injection unit 18 is led to the first flow passage 21a by the exhaust gas, whereby at least a portion of the urea water is hydrolyzed by the heating unit 30 which generates heat as a result of the pre-heating, whereby ammonia is generated. The generated ammonia is led to the discharge opening 20b by the exhaust gas and is supplied to the SCR unit 14. In the present embodiment as well, ammonia (not the urea water) is supplied to the SCR unit 14. Therefore, the SCR unit 14 can realize NOx reduction at a lower exhaust gas temperature range.

In the case where the control unit 60 judges that the operation state of the engine is not the state at the time of warming up (step S206: No), it judges that the operation state of the engine is the ordinary operation state, and turns off the first relay 61 (step S216). As a result of the first relay 61 being turned off, the heating unit 30 is electrically disconnected from the alternator 40 and the battery 42, whereby the heating unit 30 is brought into the deactivated state. The control unit 60 closes the first flow passage 21a (step S218), causes the urea water injection unit 18 to inject urea water (step S220), and returns to the detection of the operation state. The control unit 60 sends control signals to the first flow passage changeover valve 25 and the second flow passage changeover valve 26 so as to switch the valve positions of the first flow passage changeover valve 25 and the second flow passage changeover valve 26 such that the first flow passage 21a is closed as shown in FIG. 8. As a result, communication is established between the introduction opening 20a and the second flow passage 22a), whereby the introduced exhaust gas flows through the second flow passage 22a and is led to the discharge opening 20b. The urea water supplied to the introduction opening 20a by the urea water injection unit 18 is led to the second flow passage 22a by the exhaust gas and is supplied, together with the exhaust gas, to the SCR unit 14 through the discharge opening 20b. The temperature of the exhaust gas in the ordinary operation state is equal to or higher than the predetermined temperature, and urea water can be converted to ammonia by the heat of the exhaust gas.

The above-described ammonia generation apparatus 20 according to the second embodiment can realize NOx reduction at the SCR unit 14 in a temperature range lower than the conventional temperature range as in the case where the ammonia generation apparatus 20 according to the first embodiment is used.

In the ammonia generation apparatus 20 according to the second embodiment, since a step of supplying urea water to the heating unit 30 is not required, the number of times of switching of the first and second flow passage changeover valves 25 and 26 can be reduced.

In the ammonia generation apparatus 20 according to the second embodiment, since pre-heating of the heating unit 30 is performed within the closed space 21b, the heating unit 30 can efficiently generate heat without being affected by the exhaust gas temperature and the exhaust gas flow. Also, when ammonia is supplied to the SCR unit 14, the exhaust gas flowing through the first flow passage pipe 21 is supplied to the SCR unit 14. Therefore, it becomes possible to supply the exhaust gas of higher temperature to the SCR unit 14 without being affected by the exhaust gas of low temperature which does not flow through the heating unit 30, to thereby improve the efficiency of NOx reduction at the SCR unit 14.

In the ammonia generation apparatus 20 according to the second embodiment, since the conversion of the urea water to ammonia is performed at the timing when ammonia is supplied to the SCR unit 14, the amount of ammonia necessary for NOx reduction can be supplied dynamically in accordance with the operation state of the engine 510.

Figure 14:
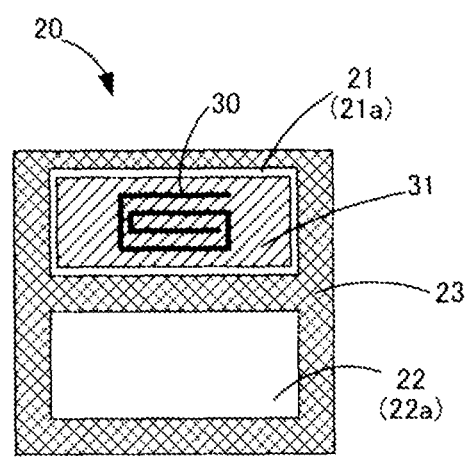
FIG. 14 is an explanatory view showing a modification of the ammonia generation apparatuses according to the first and second embodiments.

Modifications:

(1) Although the ammonia generation apparatus 20 of the first and second embodiments shown in FIGS. 2 and 3 has the first flow passage pipe 21 and the second flow passage pipe 22 which are arranged in parallel in the horizontal direction, the ammonia generation apparatus 20 may have a first flow passage pipe 21 and a second flow passage pipe 22 which are arranged in parallel in the vertical direction as shown in FIG. 14. FIG. 14 is an explanatory view showing a modification of the ammonia generation apparatus of the first and second embodiments. For example, in the case where a mounting space extending in the horizontal direction does not exist and a mounting space extending in the vertical direction can be found, the ammonia generation apparatus of the first and second embodiments can be mounted on the vehicle (in the mounting space extending in the vertical direction). Also, FIG. 14 shows an ammonia generation apparatus 20 including the already described heat reservoir 31 which can be provided in addition to the heating unit 30.

(2) In the above-described embodiments, the electric power generated by the alternator 40 can be supplied to the heating unit 30 without voltage step down by disposing a DC/DC converter between the first relay 61 and the second relay 62. As a result, the heating performance of the heating unit 30 can be enhanced, and the required amount of heat can be provided within a shorter period of time.

(3) In the above-described embodiments, the second flow passage changeover valve 26 may be omitted. Namely, since the contact between the exhaust gas flow and the heating unit 30 can be prevented by the first flow passage changeover valve 25, the problem of heat loss which would otherwise occur when the heating unit 30 comes into contact with the exhaust gas can be avoided.

Figure 15:
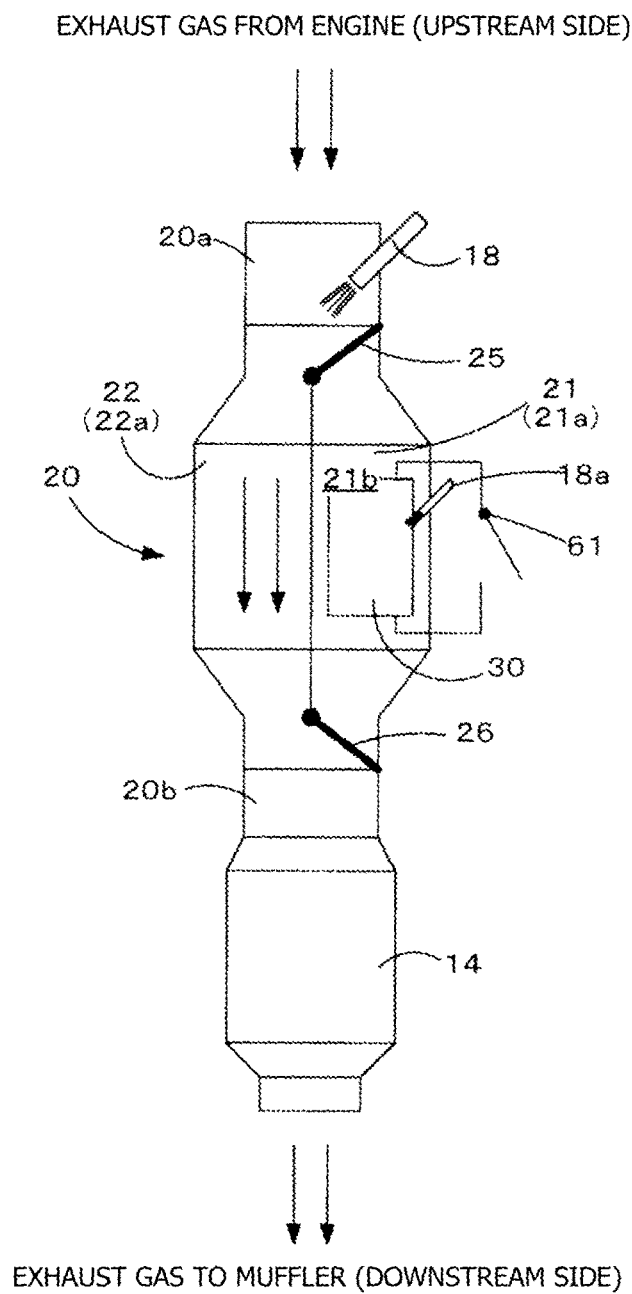
FIG. 15 is an explanatory view showing a modification of the ammonia generation apparatuses.

(4) In the above-described embodiments, in addition to the urea water injection unit 18, a second urea water injection unit 18a which injects urea water directly into the closed space 21b may be provided as shown in FIG. 15. FIG. 15 is an explanatory view showing a modification of the ammonia generation apparatuses. In this case, in the first embodiment, it becomes possible to move directly to the state shown in FIG. 6 from the state at the time of cold start shown in FIG. 4 by slipping the step shown in FIG. 5 in which urea water is supplied to the heating unit 30, to thereby reduce the number of times of operations of the first and second flow passage changeover valves 25 and 26. Also, in the first and second embodiments, the amount of urea water adhering to the first flow passage pipe 21 can be reduced, and a drop in the temperature of urea water caused by exhaust gas of low temperature can be prevented or restrained. Further, urea water can be supplied to the first flow passage pipe 21 independently of the operation states of the first and second flow passage changeover valves 25 and 26. Notably, FIG. 15 shows the already described form in which the urea water injection unit 18 is disposed in the introduction opening 20a.

(5) In the above-described embodiments, the ammonia generation apparatus 20 has the shape of a rectangular box. However, the particulate collection apparatus 20 may have a redundant shape which has a plurality of folds between the introduction opening 20a and the discharge opening 20b, or may have a cylindrical shape. Also, in the above-described embodiments, the ammonia generation apparatus 20 extends straight. However, the ammonia generation apparatus 20 may be applied to a purification system in which a portion of the structure or pipe is disposed to extend in a direction intersecting with the remaining portion of the structure or pipe and which is formed into a folded shape. For example, the ammonia generation apparatus 20 may be applied to a purification system which has a folded shape and which includes a parallel portion which becomes parallel to the ground surface when the system is mounted on a vehicle and an intersecting portion which intersects with the parallel portion, whereby the length in the flow direction of exhaust gas is shortened. Notably, the purification system may be a purification system in which the intersecting portion is a vertical portion perpendicular to the ground surface and which has a larger size in the vertical direction. In this case, the ammonia generation apparatus 20 may be disposed in the parallel portion or the intersecting portion.

Although the present invention has been described on the basis of embodiments and modifications thereof, the above-described embodiments of the invention are provided so as to facilitate understanding of the present invention and do not limit the present invention. The present invention can be modified or improved without departing from the spirit of the invention and the scopes of the claims, and the present invention encompasses equivalents thereof. For example, in order to solve, partially or entirely, the above-mentioned problem or yield, partially or entirely, the above-mentioned effects, technical features of the embodiments and modifications corresponding to technical features of the modes described in the section "Summary of the Invention" can be replaced or combined as appropriate. Also, the technical feature(s) may be eliminated as appropriate unless the present specification mentions that the technical feature(s) is essential.

DESCRIPTION OF REFERENCE NUMERALS

10: exhaust gas purification system
11: exhaust pipe

11a: manifold
11b: muffler end pipe
12: diesel oxidation catalyst
13: diesel particulate filter
14: selective catalytic reduction (SCR) unit
15: diesel oxidation catalyst
17: fuel injection unit
18: urea water injection unit
18a: second urea water injection unit
191: first temperature sensor
192: second temperature sensor
20: ammonia generation apparatus
20a: introduction opening
20b: discharge opening
201: casing
21: first flow passage pipe
21a: first flow passage
21b: closed space
22: second flow passage pipe
22a: second flow passage
23: heat insulating material
25: first flow passage changeover valve
26: second flow passage changeover valve
30: heating unit
30a: urea water holding section
31: heat reservoir
40: alternator
401: alternator-side pulley
41: accessary
42: battery
500: vehicle
510: diesel engine
511: engine-side pulley
512: belt
520: wheel
60: control unit
61: first relay
62: second relay
64: ammeter

The invention claimed is:

1. An ammonia generation control apparatus comprising:
a main body which is disposed in an exhaust passage of an internal combustion engine and has first and second flow passages that are separated from each other;
a urea water supply section which is disposed on an exhaust gas introduction side of the main body and supplies urea water to the first and second flow passages;
a heating unit disposed in the first flow passage;
a changeover section which is disposed before the flow passages in a flow direction of the exhaust gas and can selectively switch the flow direction of the exhaust gas between the first flow passage and the second flow passage; and
a control section which controls the changeover section so as to switch the flow direction of the exhaust gas to the second flow passage when the internal combustion engine is in a first operation state, wherein
a heat insulating material is charged in a space inside the main body and between the first flow passage and the second flow passage,
wherein the first operation state is an operation state in which the urea water is hydrolyzed.

2. The ammonia generation control apparatus according to claim 1, wherein the first operation state is an operation state in which the heating unit is operated.

3. The ammonia generation control apparatus according to claim 1, wherein the first operation state is an operation state in which the exhaust gas has a temperature higher than a predetermined temperature.

4. The ammonia generation control apparatus according to claim 1, wherein
the control section further controls the supply of urea water by the urea water supply section and the operation of the heating unit; and
in the first operation state, the control section switches the flow direction of the exhaust gas to the first flow passage and causes the urea water supply section to supply urea water to the first flow passage, and, after completion of the supply of urea water to the first flow passage, the control section switches the flow direction of the exhaust gas to the second flow passage and operates the heating unit.

5. The ammonia generation control apparatus according to claim 1, wherein the control section controls the changeover section so that the exhaust gas flows only through the first flow passage.

6. The ammonia generation apparatus according to claim 1, wherein the heat insulating material is a material selected from the group consisting of ceramic, a cylindrical hard ceramic material, and a foamable ceramic material.

7. An ammonia generation control apparatus comprising:
a main body which is disposed in an exhaust passage of an internal combustion engine and has first and second flow passages that are separated from each other;
a urea water supply section which is disposed on an exhaust gas introduction side of the main body and supplies urea water to the first and second flow passages;
a heating unit disposed in the first flow passage;
a changeover section which is disposed before the flow passages in a flow direction of the exhaust gas and can selectively switch the flow direction of the exhaust gas between the first flow passage and the second flow passage; and
a control section which controls the changeover section so as to switch the flow direction of the exhaust gas to the second flow passage when the internal combustion engine is in a first operation state,
wherein a heat insulating material is charged in a space inside the main body and between the first flow passage and the second flow passage,
wherein the first operation state is an operation state in which the heating unit is operated, wherein
the control section further controls the supply of urea water by the urea water supply section and the operation of the heating unit; and
in the first operation state, after switching the flow direction of the exhaust gas to the second flow passage and operating the heating unit, the control section switches the flow direction of the exhaust gas to the first flow passage and causes the urea water supply section to supply urea water to the first flow passage.

8. The ammonia generation apparatus according to claim 7, wherein the first changeover section selectively switches the flow direction of the exhaust gas so that the exhaust gas flows only through the first flow passage.

9. The ammonia generation apparatus according to claim 7, wherein the heat insulating material is a material selected from the group consisting of ceramic, a cylindrical hard ceramic material, and a foamable ceramic material.

* * * * *